United States Patent [19]

Suzuoka

[11] Patent Number: 5,416,696
[45] Date of Patent: May 16, 1995

[54] METHOD AND APPARATUS FOR TRANSLATING WORDS IN AN ARTIFICIAL NEURAL NETWORK

[75] Inventor: Takashi Suzuoka, Tiba, Japan

[73] Assignee: Kabushiki Kaisha Toshiba, Kawasaki, Japan

[21] Appl. No.: 952,412

[22] Filed: Sep. 30, 1992

Related U.S. Application Data

[63] Continuation-in-part of Ser. No. 631,273, Dec. 20, 1990, abandoned.

[30] Foreign Application Priority Data

Dec. 27, 1989 [JP] Japan .................... 1-336552
Dec. 28, 1989 [JP] Japan .................... 1-338610

[51] Int. Cl.⁶ .................... G06F 15/38; G06F 13/00
[52] U.S. Cl. .................... 364/419.02; 395/22
[58] Field of Search .................... 395/22, 23, 24, 21; 364/419.02

[56] References Cited

U.S. PATENT DOCUMENTS

| | | | |
|---|---|---|---|
| 4,660,166 | 4/1987 | Hopfield | 364/807 |
| 4,876,731 | 10/1989 | Loris et al. | 382/40 |
| 5,014,219 | 5/1991 | White | 364/513 |
| 5,091,965 | 2/1992 | Kobayashi et al. | 382/15 |
| 5,253,328 | 10/1993 | Hartman | 395/24 |

OTHER PUBLICATIONS

Waltz et al., "Massively Parallel Parsing: A Strongly Interactive Model of Natural Language Interpretation", Cognitive Science, 1985, 51–74.
Small et al., Lexical Ambiguity Resolution, Morgan Kaufmann Pub., 1988, 179–194.
Jodouin et al., "The Waltz and Pollack Model of Natural Language Processing: Critiques and Extensions," Intl. Neural Network Conf. Jul. 1990, 541–554.
Waibel et al., "Janus: A Speech-to-Speech Translation System Using Connectionist and Symbolic Processing Strategies," ICASSP 91, May 1991, 793–796.

Primary Examiner—Robert W. Downs
Attorney, Agent, or Firm—Foley & Lardner

[57] ABSTRACT

An apparatus for translating original words in an original sentence into words in a translated sentence consists of a sentence structure analysis dictionary, a translation dictionary, an inflection dictionary, a knowledge dictionary, grammar dictionaries of original language and translated language, a translation unit, and a processing device with an artificial neural network in which an external input is provided one after another to each of the artificial neurons assigned the words of the translated language linguistically corresponding to the original words classified as polysemy and semantically corresponding to the original words classified as monosemy, the external input provided to each of the artificial neurons is stored therein, and the value of the external input previously stored in the artificial neurons is uniformly reduced to again provide to each of the artificial neurons as past records each time the external input is provided to each of the artificial neurons.

6 Claims, 12 Drawing Sheets

FIG.4 (a)
ARRANGEMENT
| ARTIFI-CIAL NEURON 1 | ARTIFI-CIAL NEURON 0 |
|---|---|
| ARTIFI-CIAL NEURON 2 | ARTIFI-CIAL NEURON 3 |
FIG.4 (b)
PATTERN TO BE STORED
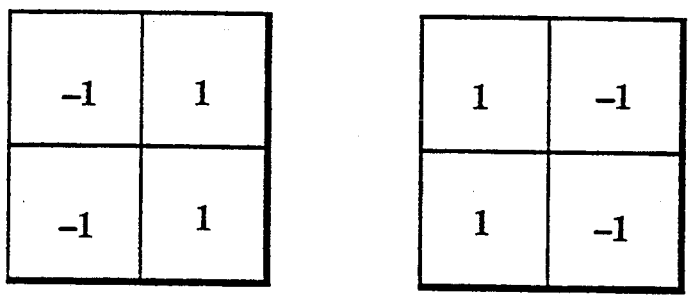
FIG.4 (c)
NETWORK ASSOCIATING TWO PATTERNS
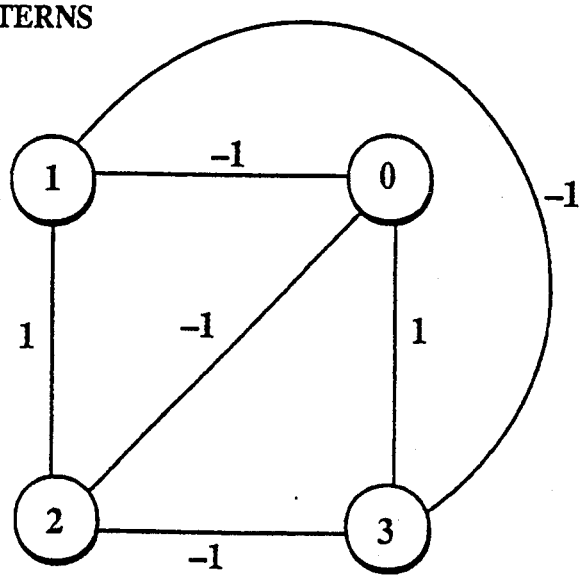

THE NUMBER IN ○ IS NEURON NUMBER.

THE RANGE OF OUTPUT VALUES OF
ARTIFICIAL NEURONS j

PATTERN 0

PATTERN 1

PATTERN 2

METHOD AND APPARATUS FOR TRANSLATING WORDS IN AN ARTIFICIAL NEURAL NETWORK

This application is a continuation-in-part of application Ser. No. 07/631,273, filed Dec. 20, 1990, now abandoned.

BACKGROUND OF THE INVENTION

1. Field of the Invention

The present invention relates to a method and apparatus For translating words in an artificial neural network, and, in particular, to a method and apparatus for implementing machine translation by associating translated words from original words. In addition, the present invention relates to association of a pattern in an artificial neural network.

2. Description of the Background Art

An artificial neural network comprising a plurality of artificial neurons interconnected each other through links respectively weighted has been recently attempted in order to implement various processes.

For example, an output value of an artificial neuron is determined after receiving output values of the other interconnected artificial neurons according to the Hopfield model which is a general model of the artificial neural network. Moreover, the output value of the artificial neuron is given to the other interconnected artificial neurons for implementing various association processes.

In cases where the number of artificial neurons is N, the output value of an artificial neuron i is $O_i$, the weight of a link directed from an artificial neuron i to an artificial neuron j is $W_{ji}$, an external input value provided to the artificial neuron j from the outside is $I_j$, a momentum parameter is $\delta$, and the number of calculation times is t, the output value $O_j$ of the artificial neuron j can be obtained by applying the following equations:

$$O_j^{t+1} = f(\text{net}_j^{t+1}) \quad (1)$$

$$\text{net}_j^{t+1} = \delta(\Sigma W_{ji} O_i^t + I_j) + (1-\delta)\text{net}_j^t \quad (2)$$

where f is a monotonic increasing function with upper and lower limits.

In this case, if it is desired to have the output of one artificial neuron be similar to the output of another neuron, it is necessary to provide a link with a positive weight between the two artificial neurons. On the other hand, when it is desired to have the output value of one artificial neuron be far from the output value of another neuron, it is necessary to provide a link with a negative weight between the two artificial neurons.

For example, in cases where six artificial neurons 0 to 5 are assigned to picture elements $G_0$ to $G_5$ arranged in a hexagonal form in a first conventional example as shown in FIG. 1, the utilization of an artificial neural network as shown in FIG. 2 is required to store six patterns 0 to 5 shown in FIG. 8.

The artificial neural network shown in FIG. 2 is composed of the artificial neurons 0 to 5 which each is positioned at a corresponding node and links through which the nodes are interconnected in pairs. Each link is weighted by a weight of 2 or $-3$.

In the above configuration of the artificial neural network shown in FIG. 2, in cases where the value of the picture element $G_1$ is 1, the value of the picture element $G_5$ is 1, and the values of the other picture elements $G_0$, $G_2$, $G_3$, $G_4$ are not specified, the output values $O_0$, $O_1$, $O_2$, $O_3$, $O_4$ and $O_5$ of the artificial neurons 0 to 5 are initially set as follows $$O_0 = O_1 = O_2 = O_3 = O_4 = O_5 = 0$$

Moreover, the external inputs $I_0$, $I_1$, $I_2$, $I_3$, $I_4$, $I_5$ are set as follows $$I_1 = 1, I_5 = 1,$$

$$I_0 = I_2 = I_3 = I_4 = 0.$$

As a result, these outputs are finally converged as follows $$O_0 = O_1 = O_5 = 1,$$

$$O_2 = O_3 = O_4 = -1.$$

This means that the pattern 0 shown in FIG. 3 is finally associated.

As mentioned above, when information sufficient for associating a desired pattern is given at one time, it is possible to implement the association of the desired pattern in the artificial neural network shown in FIG. 2 according to the Hopfield model.

However, when it is impossible to provide information sufficient for associating the desired pattern to an artificial neural network, it is very difficult to implement the association of the desired pattern in the Hopfield model. Specifically, in cases where partial items of information are fragmentarily provided to the artificial neural network while a pattern to be associated by the provision of the information is changed little by little, the association of the desired pattern is impossible. For example, we will consider the case that the external inputs $I_0$ to $I_5$ are given as shown in Table 1:

TABLE 1

| Times | 0 | 1 | 2 | 3 | 4 | 5 | 6 | 7 | 8 |
|---|---|---|---|---|---|---|---|---|---|
| $I_0$ | 0 | 0 | 0 | 0 | 0 | 0 | 1 | 0 | 1 |
| $I_1$ | 0 | 0 | 0 | 0 | 1 | 0 | 0 | 0 | 1 |
| $I_2$ | 1 | 0 | 0 | 0 | 0 | 1 | 0 | 1 | 0 |
| $I_3$ | 0 | 1 | 0 | 0 | 0 | 0 | 0 | 0 | 0 |
| $I_4$ | 0 | 0 | 1 | 0 | 0 | 0 | 0 | 0 | 0 |
| $I_5$ | 0 | 0 | 0 | 1 | 0 | 0 | 0 | 0 | 1 |
| $O_0$ | −1 | −1 | −1 | −1 | −1 | −1 | −1 | −1 | 1 |
| $O_1$ | 1 | 1 | −1 | −1 | −1 | −1 | −1 | −1 | 1 |
| $O_2$ | 1 | 1 | 1 | −1 | −1 | 1 | 1 | 1 | −1 |
| $O_3$ | 1 | 1 | 1 | 1 | 1 | 1 | 1 | 1 | −1 |
| $O_4$ | −1 | −1 | 1 | 1 | 1 | 1 | 1 | 1 | −1 |
| $O_5$ | −1 | −1 | −1 | 1 | 1 | −1 | −1 | −1 | 1 |

In Table 1, the upper half shows the changes of external inputs $I_0$ to $I_5$, and the lower half shows the outputs $O_0$ to $O_5$ in finally stable states at the respective times.

Moreover, numerals 0 to 8 designated in the horizontal direction show the number of provision times of the external inputs. In this case, it is necessary that the interval in which each of the external inputs $I_0$ to $I_5$ is provided to a corresponding artificial neuron be effectively longer than a prescribed time required for stabilizing the artificial neural network. In other words, it is necessary that the artificial network have been already stabilized when the external inputs are given.

In this example, the external inputs are conducted so as to implement both the association of the pattern 3 or 4 by the changes of the external inputs in the time interval from the time 0 to 3 and the association of the pattern 1 or 0 by the changes in the time interval from the time 4 to 8. In other words, partial items of information designating a prescribed pattern to be associated are fragmentarily provided to the artificial neural network at both the interval from the time 0 to 3 and the interval from the time 4 to 8.

Patterns obtained from Table 1 are as follows:

| time 0 → Pattern 2, | time 4 → Pattern 4, |
|---|---|
| time 1 → Pattern 2, | time 5 → Pattern 3, |
| time 2 → Pattern 3, | time 6 → Pattern 3, |
| time 3 → Pattern 4, | time 7 → Pattern 3, |
|  | time 8 → Pattern 0 |

However, in such a conventional method, as clearly seen from the patterns to be obtained in Table 1, the patterns actually associated in the intervals from the time 4 to 7 differs from the desired pattern 1 or 0, while the desired pattern 3 or 4 can be associated in the intervals from the time 0 to 3. Therefore, it is difficult to follow the changes for associating the desired patterns in turn. The reason is because the external inputs fragmentarily provided are not stored in the artificial neural network in the conventional Hopfield method.

Namely, in such a conventional artificial neural network for associating patterns, when a new pattern which differs from another pattern which has been associated at the present time is received in the artificial neural network, in other words, when the pattern 4 is, for example, associated at the time 3 before the external input is provided to the artificial neuron 1 at the time 4, a partial item of information fragmentarily given by the external input $I_1$ at the time 4 is ignored as a noise because a small number of external inputs are received in the artificial neural network. On the other hand, if a large number of external inputs are received at one time, the new pattern to be associated is immediately obtained. For example, when the pattern 3 is associated at the time 7 before the external inputs $I_0$, $I_1$, $I_5$ are given at the time 8 to associate an opposite pattern 0, the pattern 3 is exchanged with the pattern 0.

Accordingly, in cases where a series of partial items of information for changing an associated pattern is fragmentarily provided to the artificial neural network, it is very difficult to correctly implement the association because the series of partial items of information are likely to be ignored.

Next, a second conventional example will be described.

For example, four artificial neurons 0,1,2, and 3 are respectively assigned to four picture elements as shown in FIG. 4a. In this case, an artificial neural network as shown in FIG. 4c is utilized to associate one of two patterns as shown in FIG. 4b.

In cases where a picture element assigned to the artificial neuron 0, which is located at the upper right position, has a value 1, and values of the other picture elements are unknown, external inputs are respectively set as follows:

$I_0$ = a positive constant $I_1 = I_2 I_3 = 0$

Therefore, an output value $O_0$ of the artificial neuron 0 changes to a positive value, and the positive value is propagated to the other artificial neurons. Therefore, all the output values are finally converged as follows:

$O_0 = O_3 = 1$ $O_1 = O_2 = -1$

As a result, the left pattern in FIG. 4b is associated.

As mentioned above, the artificial neural network can be operated quite efficiently in the second conventional example in the case of a small-scale neural network. However, in the case of a large-scale neural network in which a relatively small number of external inputs are provided, the association occasionally becomes impossible.

FIG. 5 shows a part of an artificial neural network according to the second conventional example. The output values of artificial neurons 0 to 5 are assumed to be respectively 1 or $-1$.

In the network, a group of artificial neurons 1 to 4 has the combination of the output values which each represents a stable state, as follows.

{output value of artificial neuron 1, output value of artificial neuron 2, output value of artificial neuron 3, output value of artificial neuron 4} = {1, $-1$, 1 $-1$} or {$-1$, 1, $-1$, 1}

In the network, one of the suitable stable states should be selected not by the output of the artificial neuron 0 but by that of the artificial neuron 5.

The reason is that the absolute value of the weight provided to a link interconnecting between the artificial neuron 5 and the artificial neuron 4 is far higher than that of the weight provided to a link interconnecting between the artificial neuron 0 and the artificial neuron 1.

However, because of the input time delay resulting from the difference between external inputs or propagation delay, it can be assumed that the propagation time from the artificial neuron 0 to the artificial neuron 1 is faster than that from the artificial neuron 5 to the artificial neuron 4.

If such a propagation difference is sufficiently large, it can also be assumed that a partial item of information is provided to the artificial neurons 2,3,4 from the artificial neuron 1 receiving the output value of the artificial neuron 0, so that the artificial neurons 2, 3, 4 are activated by the information from the artificial neuron 1 and reach an incorrect stable state.

Once, these artificial neurons are stabilized, they cannot be shifted to a correct stable state regardless of whether a high absolute output value is provided by the artificial neuron 5.

As is described above, in case of the first conventional example for associating patterns in an artificial neural network, because the external inputs fragmentarily provided are not stored, the association cannot be correctly implemented when a series of partial items of information designating a specific pattern is fragmentarily provided.

On the other hand, in the second conventional example for associating patterns in an artificial neural network, because artificial neurons receiving external inputs provide output values in the same range as others not receiving external inputs, it is sometimes impossible to correctly implement the association.

In the second conventional example, each of the artificial neurons receiving the external inputs should provide an output value with the same sign (positive or negative) as the external inputs. Therefore, the output value is expected to form a portion of a desired stable state. On the other hand, each of the artificial neurons not receiving external inputs is required to provide an output value which can lead the artificial neurons to a more stable state.

Accordingly, it is preferred that the external inputs be regarded to be important in the artificial neurons receiving them. Moreover, it is preferable that the output values of such artificial neurons have more important meaning than the artificial neurons not receiving external inputs.

However, when the output value of each artificial neuron not receiving external inputs reaches a high absolute value due to noise or output values from other artificial neurons, even if an attempt is made to change the output values of the artificial neurons receiving external inputs thereafter, it is impossible to make the alteration.

Accordingly, in the First and the second conventional examples, when a series of partial items of information are fragmentarily provided to the artificial neurons, it is very difficult to implement the association. Of course, it is preferable to implement the association in a short time, but when the association is completed by utilizing only the small number of items of information provided at first to implement the association in a short time, a user often obtains an undesired pattern. Moreover, once an undesired pattern is associated, it is very difficult to revise it.

In addition, in cases where the association implemented by the artificial neural network is utilized for machine translation of original words, translated words are not correctly obtained if the artificial neural network easily associates undesired words. The reason is that each of the original words classified as polysemy linguistically corresponds to a plurality of the translated words, while each of the original words classified as monosemy linguistically corresponds to a translated word.

Therefore, when an original sentence written by the original words are translated into a translated sentence, a translated word semantically corresponding to an original word classified as the polysemy must be correctly selected from words linguistically corresponding to the original word while considering a topic of the original sentence.

SUMMARY OF THE INVENTION

A first object of the present invention is to provide, with due consideration to the drawbacks of such conventional methods, a method for translating original words of an original sentence into words of a translated sentence in an artificial neural network in which the words of the translated sentence are correctly associated with the original words. Moreover, the first object is to provide an apparatus in which the translated sentence is correctly made up by implementing the method.

A second object of the present invention is to provide a method For translating original words of an original sentence into words of a translated sentence in an artificial neural network in which artificial neurons are correctly led to stable states to associate the words of the translated sentence with the original words. Moreover, the second object is to provide an apparatus in which the translated sentence is correctly made up by implementing the method.

A third object of the present invention is to provide a method for implementing association of a desired pattern in an artificial neural network, regardless of whether a series of partial items of information are fragmentarily provided to artificial neurons in the artificial network.

A fourth object of the present invention is to provide a method for implementing association of a desired pattern in an artificial neural network in which artificial neurons are correctly led to stable states.

The first object is achieved by the provision of a method for translating original words in an original sentence written by a first language into words in a translated sentence of a second language in an artificial neural network in which a plurality of artificial neurons are interconnected through links, an output value of an artificial neuron Nl depends on a value of an external input provided to the artificial neuron Nl and output values of the other artificial neurons interconnected with the artificial neuron Nl through the links, and the output values of all the artificial neurons are determined after the convergence of the output values, comprising the steps of:

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons;

weighting the links through which the artificial neurons assigned the words semantically relevant to one another are interconnected, with positive values, the output values of the artificial neurons interconnected through the links with the positive values being increased in cases where an external input is provided to one of the artificial neurons;

weighting the links through which the artificial neurons which are assigned the words semantically irrelevant to one another are interconnected, with negative values, the output values of the artificial neurons interconnected through the links with the negative values being decreased in cases where an external input is provided to one of the artificial neurons;

providing external inputs Im to artificial neurons Nm which are assigned words Wm of the second language linguistically and semantically corresponding to the original words classified as the monosemy to increase the output values of artificial neurons Nms assigned the words semantically relevant to the words Wm and to decrease the output values of artificial neurons Nmi assigned the words semantically irrelevant to the words Wm;

providing an external input Ip, one after another, to each of the artificial neurons Nms to considerably increase the output values of artificial neurons Nmp which belongs to the artificial neurons Nms and artificial neurons Np assigned the words of the second language linguistically corresponding to the original words classified as the polysemy, the external input Ip provided to each of the artificial neurons Nms being stored therein, and the value of the external input Ip previously stored in the artificial neurons Nms being uniformly reduced to provide again to each of the artificial neurons Nms as past records each time the external input Ip is provided to each of the artificial neurons Nms;

repeatedly converging the output values of all of the artificial neurons each time the external input Ip is provided to each of the artificial neurons Nms;

adopting words Wmp assigned to the artificial neurons Nmp, as translated words, of which the output values are considerably increased; and adopting the words Wm as the translated words, the translated sentence of the second language being composed of the words Wmp and the words Wm.

In the above steps, when the external inputs Im are provided to the artificial neurons assigned the words Wm of the second language linguistically and semantically corresponding to the original words classified as the monosemy, the output values of the artificial neurons Nms assigned the words semantically relevant to the words Wm are increased, while the output values of the artificial neurons Nmi assigned the words semantically irrelevant to the words Wm are increased.

In this case, the increase of the output values of the artificial neurons Nmp which belongs to a group of artificial neurons Nms and a group of artificial neurons Np assigned the words off the second language linguistically corresponding to the original words classified as the polysemy is not necessarily large enough to adopt the words assigned to the artificial neurons Nmp as the translated words. The reason is that each of the artificial neurons Nmp is generally interconnected with the artificial neurons Nm through a large number of links so that the influence of the output values of the artificial neurons Nm on the output values of the artificial neurons Nmp is reduced. Therefore, the words assigned to the artificial neurons Nmp are not correctly associated with the original words.

To correctly associate the words assigned to the artificial neurons Nmp with the original words, the external input Ip is provided to each of the artificial neurons Nms of which the output values are increased one after another.

In this case, because the external input Ip provided to each of the artificial neurons Nms is stored and the value of the external input Ip previously stored in the artificial neurons Nms is uniformly reduced to provide again to each of the artificial neurons Nms as past records each time the external input Ip is provided to each of the artificial neurons Nms, the output values of the artificial neurons Nmp are reliably and gradually increased without eliminating the external input Ip as noise.

Therefore, the output values of the artificial neurons Nmp are considerably increased. Accordingly, the words assigned to the artificial neurons Nmp can be correctly adopted as the translated words by which the translated sentence is formed.

The first object is also achieved by provision of an apparatus for translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words of the second language;

processing means for (1) operating an artificial neural network in which
   a plurality of artificial neurons are assigned the words of the second language stored in the second language word memory means,
   positive links through which the artificial neurons assigned the words semantically relevant to one another are interconnected are weighted with positive values to increase the output values of the artificial neurons in cases where an external input is provided to one of the artificial neurons, and
   negative links through which the artificial neurons assigned the words semantically irrelevant to one another are interconnected are weighted with negative values to decrease the output values of the artificial neurons in cases where an external input is provided to one of the artificial neurons, (2) providing external inputs Im to artificial neurons Nm which are assigned words Wm of the second language linguistically and semantically corresponding to the original words classified as the monosemy to increase the output values of artificial neurons Nms assigned the words semantically relevant to the words Wm and to decrease the output values of artificial neurons Nmi assigned the words semantically irrelevant to the words Wm, (3) providing an external input Ip, one after another, to each of the artificial neurons Nms to considerably increase the output values of artificial neurons Nmp which belongs to the artificial neurons Nms and artificial neurons Np assigned the words of the second language linguistically corresponding to the original words classified as the polysemy, the external input Ip provided to each of the artificial neurons Nms being stored therein, and the value of the external input Ip previously stored in the artificial neurons Nms being uniformly reduced to provide again to each of the artificial neurons Nms as past records each time the external input Ip is provided to each of the artificial neurons Nms, (4) repeatedly converging the output values of all of the artificial neurons each time the external input Ip is provided to each of the artificial neurons Nms, (5) adopting words Wmp assigned to the artificial neurons Nmp, as translated words, of which the output values are considerably increased, and (6) adopting the words Wm as the translated words, the translated sentence being composed of the word Wmp and the words Wm; and translation means for translating the original sentence into the translated sentence according to a translation process in which (1) the sentence structure of the original sentence is analyzed by referring the parts of speech of the original words stored in the sentence structure memory means and the grammar of the first language stored in the original language grammar memory means, (2) the original words are changed to a series of words which are composed of the words linguistically corresponding to the original words classified as the monosemy and the words Wmp, Wm adopted in the processing means, and (3) a series of words of the second language are changed to the translated sentence by referring the grammar of the second language stored in the translated language grammar memory means and the inflection information of the words of the second language stored in the inflection memory means.

In the above configuration, the sentence structure and the grammar of the original sentence are analyzed by referring the sentence structure memory means and the first language grammar memory means in the translation.

Thereafter, the words of the second language are selected in the artificial neural network of the processing means. In this case, the external input Ip is provided, one after another, to each of the artificial neurons Nms which are interconnected through the positive links. Moreover, the external input Ip is provided again as the past records after the value of the external input Ip is reduced each time the external input Ip is provided to each of the artificial neurons Nms. In addition, the artificial neurons Nm assigned the words Wm semantically corresponding to the original words classified as the monosemy belong to the artificial neurons Nms. Therefore, though each of the original words classified as the polysemy linguistically corresponds to a plurality of words of the second language, the output values of the artificial neurons Nmp assigned the words Wmp of the second language semantically corresponding to the original words of the original sentence classified as the polysemy is considerably increased.

Accordingly, the words Wmp assigned to the artificial neurons Nmp can be correctly selected from the words of the second language linguistically corresponding to the original words of the original sentence classified as the polysemy.

Thereafter, the grammar and the inflection of the second language are analyzed in the translation means to correctly make up the translated sentence from a series of words Wmp, Wm of the second language adopted by the processing means.

Accordingly, the translated sentence can be correctly made up.

The second object is achieved by the provision of a method for translating original words in an original sentence written by a first language into words of a translated sentence of a second language in an artificial neural network in which a plurality of artificial neurons are interconnected through links with weights and each artificial neuron provides an output value, comprising the steps of:

defining an output value $O_j$ of an artificial neuron $j$ regardless of whether or not the artificial neuron $j$ receives an external input value $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and (b) a value of a variable $net_j$ depending on a value of an external input $I_j$ provided to the artificial neuron $j$, output values $O_i$ of the other artificial neurons $i$ interconnected with the artificial neuron $j$ through the links weighted with weight parameters $W_{ji}$, and the weight parameters $W_{ji}$, as is formulated by an equation (3)

$$net_j = \sum_i W_{ji} O_i + I_j \quad (3)$$

wherein the value of the external input $I_j$ equals zero when the artificial neuron $j$ receives no external input;

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons;

weighting the links through which the artificial neurons assigned the words semantically relevant to one another are interconnected, with positive values to increase the output values of the artificial neurons in cases where an external input is provided to one of the artificial neurons;

weighting the links through which the artificial neurons assigned the words semantically irrelevant to one another are interconnected, with negative values to decrease the output values of the artificial neurons in cases where an external input is provided to one of the artificial neurons;

providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm;

selecting artificial neurons Nh of which the output values are increased by the provision of the external input Im from artificial neurons Np assigned the words of the second language linguistically corresponding to the original words classified as the polysemy;

selecting artificial neurons Nl of which the output values are decreased by the provision of the external input Im from the artificial neurons Np;

providing an external input Iph with a high value to the artificial neurons Nh to considerably increase the output values of the artificial neurons Nh to above a value h(O) according to the equations (1) and (3);

providing an external input Ipl with a low value to the artificial neurons Nl to considerably decrease the output values of the artificial neurons Nl to below a value l(O) according to the equations (1) and (3);

adopting words Wp assigned to the artificial neurons Nh, as translated words, of which the output values are higher than the value h(O); and adopting the word Wm as the translated words, the translated sentence being composed of the words Wp and the words Wm.

In the above steps, when the external inputs Im are provided to the artificial neurons Nm assigned the words Wm of the second language linguistically and semantically corresponding to the original words classified as the monosemy, the output values of the artificial neurons assigned the words semantically relevant to the words Wm are increased, while the output values of the artificial neurons assigned the words semantically irrelevant to the words Wm are decreased.

In this case, the increase of the output values of the artificial neurons Nh which belongs to a group of artificial neurons Nms and a group of artificial neurons Np assigned the words of the second language linguistically corresponding to the original words classified as the polysemy is not necessarily large enough to adopt the words Wp assigned to the artificial neurons Nh as the translated words. The reason is that each of the artificial neurons Nh is generally interconnected with the artificial neurons Nm through a large number of links so that the influence of the output values of the artificial neurons Nm on the output values of the artificial neurons Nh is reduced. In addition, the output values of the artificial neurons Nh are immediately reduced because the output values are not so high. Therefore, the words assigned to the artificial neurons Np are not correctly associated with the original words.

To correctly associate the words assigned to the artificial neurons Nh with the original words, the output values of the artificial neurons Nh must be a high value such as above a value h(O) to keep the output values high for a period of time.

Therefore, the artificial neurons Nh and the artificial neurons Nl are selected, and the external input Iph with a high value is provided to the artificial neurons Nh because the words Wp assigned to the artificial neurons Nh are semantically relevant to the original words classified as the monosemy, while the external input Ipl with a low value is provided to the artificial neurons Nl because the words assigned to the artificial neurons Nl are semantically irrelevant to the original words classified as the monosemy.

As a result, the output values of the artificial neurons Nh are considerably increased, and the output values of the artificial neurons Nl are considerably decreased.

Accordingly, the words Wp assigned to the artificial neurons Nh can be correctly adopted as the translated language without adopting the words assigned to the artificial neurons Nl.

In addition, the output values of the artificial neurons Nh, Nl are adjusted according to the values of the external inputs Iph, Ipl provided to the artificial neurons Nh, Nl according to the equations (1) and (3).

Accordingly, the artificial neurons are correctly led to stable states to adopt the words Wp.

The second object is also achieved by the provision of an apparatus of for translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words of the second language;

processing means for (a) operating an artificial neural network in which
a plurality of artificial neurons are assigned the words of the second language stored in the second language word memory means, positive links through which the artificial neurons assigned the words semantically relevant to one another are interconnected are weighted with positive values to increase the output values of the artificial neurons in cases where an external input is provided to one of the artificial neurons, and negative links through which the artificial neurons assigned the words semantically irrelevant to one another are interconnected are weighted with negative values to decrease the output values of the artificial neurons in cases where an external input is provided to one of the artificial neurons, (b) defining an output value $O_j$ of an artificial neuron j regardless of whether or not the artificial neuron j receives an external input value $I_j$, the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and a value of a variable $net_j$ depending on a value of an external input $I_j$ provided to the artificial neuron j, output values $O_i$ of the other artificial neurons i interconnected with the artificial neuron j through the links weighted with weight parameters $W_{ji}$, and the weight parameters $W_{ji}$, as is formulated by an equation (3)

$$net_j = \sum_i W_{ji}O_i + I_j \quad (3)$$

wherein the value of the external input $I_j$ equals zero when the artificial neuron J receives no external input, (c) providing external inputs Im to artificial neurons Nm which are assigned words Wm of the second language linguistically and semantically corresponding to the original words classified as the monosemy to increase the outputs of artificial neurons Nms assigned the words semantically relevant to the words Wm and to decrease the output values of artificial neurons Nmi assigned the words semantically irrelevant to the words Wm, (d) selecting artificial neurons Nh of which the output values are increased by the provision of the external input Im from artificial neurons Np assigned the words of the second language linguistically corresponding to the original words classified as the polysemy, (e) selecting artificial neurons Nl of which the output values are decreased by the provision of the external input Im from the artificial neurons Np, (f) providing an external input Iph with a high value to the artificial neurons Nh to considerably increase the output values of the artificial neurons Nh to above a value h(O) according to the equations (1) and (3), (g) providing an external input Ipl with a low value to the artificial neurons Nl to considerably decrease the output values of the artificial neurons Nl to below a value l(O) according to the equations (1) and (3), (h) adopting words Wp assigned to the artificial neurons Nh, as translated words, of which the outputs are higher than the value h(O), and (i) adopting the word Wm as the translated words, the translated sentence being composed of the words Wp and the words Wm; and translation means for translating the original sentence into the translated sentence according to a translation process in which the sentence structure of the original sentence is analyzed by referring the parts of speech of the original words stored in the sentence structure memory means and the grammar of the first language stored in the original language grammar memory means, the original words are changed to a series of words which are composed of the words linguistically corresponding to the original words classified as the monosemy and the words Wp, Wm adopted in the processing means, and a series of words of the second language are changed to the translated sentence by referring the grammar of the second language stored in the translated language grammar memory means and the inflection information of the words of the second language stored in the inflection memory means.

In the above configuration, the sentence structure and the grammar of the original sentence are analyzed by referring the sentence structure memory means and the first language grammar memory means in the translation.

Thereafter, the words of the second language are selected in the artificial neural network of the processing means. In this case, the external input Iph with a high value is provided to the artificial neurons Nh which are assigned the words Wp of the second language semantically corresponding to the original words of the original sentence classified as the polysemy, while the external input Ipl with a low value is provided to the artificial neurons Nl. Therefore, the output values of the artificial neurons Nh are considerably increased, while the output values of the artificial neurons Nl are considerably decreased.

As a result, the output values of the artificial neurons Nh is kept high for a period of time as compared with the output values of the artificial neurons Nl.

Accordingly, though each of the original words classified as the polysemy linguistically corresponds to a plurality of words of the second language, the words Wp assigned to the artificial neurons Nh can be correctly adopted as the translated language.

Thereafter, the grammar and the inflection of the second language are analyzed in the translation means to correctly make up the translated sentence from a series of words Wp, Wm of the second language adopted by the processing means.

Accordingly, the translated sentence can be correctly made up.

The first and second objects are achieved by the provision of a method for translating original words in an original sentence written by a first language into words of a translated sentence of a second language in an artificial neural network in which a plurality of artificial neurons are interconnected through links with weights and each artificial neuron provides an output value, comprising the steps of:

defining an output value $O_j$ of an artificial neuron j regardless of whether or not the artificial neuron j receives an external input value $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and (b) a value of a variable $net_j$ depending on a value of an external input $I_j$ provided to the artificial neuron j, output values $O_i$ of the other artificial neurons i interconnected with the artificial neuron j through the links weighted by weight parameters $W_{ji}$, and the weight parameters $W_{ji}$, as is formulated by an equation (3)

$$net_j = \sum_i W_{ji}O_i + I_j \quad (3)$$

where the value of the external input $I_j$ equals zero when the artificial neuron j receives no external input;

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons, weighting the links through which the artificial neurons assigned the words semantically relevant to one another are interconnected, with positive values, the output values of the artificial neurons being increased in cases where an external input is provided to one of the artificial neurons;

weighting the links through which the artificial neurons assigned the words semantically irrelevant to one another are interconnected, with negative values, the output values of the artificial neurons being decreased in cases where an external input is provided to one of the artificial neurons;

providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm;

selecting artificial neurons Nh of which the output values are increased by the provision of the external input Im from artificial neurons Np assigned the words of the second language linguistically corresponding to the original words classified as the polysemy;

providing an external input Ip with a high value, one after another to each of the artificial neurons Nms to considerably increase the output values of the artificial neurons Nms to above a value h(0) according to the equations (1) and (3), the external input Ip provided to each of the artificial neurons Nms being stored therein, and the value of the external input Ip previously stored in the artificial neurons Nms being uniformly reduced to provide again to each of the artificial neurons Nms as past records each time the external input Ip is provided to each of the artificial neurons Nms;

repeatedly converging the output values of all of the artificial neurons each time the external input Ip is provided to each of the artificial neurons Nms;

adopting words Wp assigned to the artificial neurons Nh of which the outputs are higher than the value h(O), as translated words; and adopting the word Wm as the translated words, the translated sentence being composed of the words Wp and the words Wm.

In the above steps, the external input Ip is provided, one after another, to the artificial neurons Nms. Thereafter, the external input Ip provided to each of the artificial neurons Nms are stored and gradually decreased to provide again to the artificial neurons Nms.

In addition, the output values of the artificial neurons Nms are adjusted according to the equations (1) and (3) in cases where the value of the external input Ip provided to the artificial neurons Nms is varied.

Therefore, the external input Ip provided to each of the artificial neurons Nms is not eliminated as noise. In addition, the output values of the artificial neurons Nh assigned the words WD semantically relevant to the original words classified as the polysemy can be adjusted to high output values.

Accordingly, the words Wp assigned to the artificial neurons Nh can be correctly adopted as the translated words.

The first and second objects are also achieved by the provision of an apparatus for translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words of the second language;

processing means for (a) operating an artificial neural network in which a plurality of artificial neurons are assigned the words of the second language stored in the second language word memory means, positive links through which the artificial neurons assigned the words semantically relevant to one another are interconnected are weighted with positive values to increase the output values of the artificial neurons in cases where an external input is provided to one of the artificial neurons, and negative links through which the artificial neurons assigned the words semantically irrelevant to one another are interconnected are weighted with negative values to decrease the output values of the artificial neurons in cases where an external input is provided to one of the artificial neurons, (b) defining an output value $O_j$ of an artificial neuron j regardless of whether or not the artificial neuron j receives an external input value $I_j$, the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and a value of a variable $net_j$ depending on a value of an external input $I_j$ provided to the artificial neuron j, output values $O_i$ of the other artificial neurons i interconnected with the artificial neuron j through the links weighted by weight parameters $W_{ji}$, and the weight parameters $W_{ji}$, as is formulated by an equation (3)

$$net_j = \sum_i W_{ji} O_i + I_j \qquad (3)$$

wherein the value of the external input $I_j$ equals zero when the artificial neuron j receives no external input, (c) providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm, (d) selecting artificial neurons Nh of which the output values are increased by the provision of the external input Im from artificial neurons Np assigned the words of the second language linguistically corresponding to the original words classified as the polysemy, (e) providing an external input Ip with a high value, one after another to each of the artificial neurons Nms to considerably increase the output values of the artificial neurons Nms to above a value h(O) according to the equations (1) and (3), the external input Ip provided to each of the artificial neurons Nms being stored therein, and the value of the external input Ip previously stored in the artificial neurons Nms being uniformly reduced to provide again to each of the artificial neurons Nms as past records each time the external input Ip is provided to each of the artificial neurons Nms, (f) repeatedly converging the output values of all of the artificial neurons each time the external input Ip is provided to each of the artificial neurons Nms, (g) adopting words Wp assigned to the artificial neurons Nh of which the outputs are higher than the value h(O), as translated words, and (h) adopting the word Wm as the translated words, the translated sentence being composed of the words Wp and the words Wm; and translation means for translating the original sentence into the translated sentence according to a translation process in which the sentence structure of the original sentence is analyzed by referring the parts of speech of the original words stored in the sentence structure memory means and the grammar of the first language stored in the original language grammar memory means, the original words are changed to a series of words which are composed of the words linguistically corresponding to the original words classified as the monosemy and the words Wp, Wm adopted in the processing means, and a series of words of the second language are changed to the translated sentence by referring the grammar of the second language stored in the translated language grammar memory means and the inflection information of the words of the second language stored in the inflection memory means.

In the above configuration, the sentence structure and the grammar of the original sentence are analyzed by referring the sentence structure memory means and the first language grammar memory means in the translation.

Thereafter, the words of the second language are selected in the artificial neural network of the processing means. In this case, the external input Ip with a high value is provided, one after another, to each of the artificial neurons Nms which are interconnected through the positive links. Moreover, the external input Ip is provided again as the past records after the value of the external input Ip is reduced each time the external input Ip is provided to each of the artificial neurons Nms. In addition, the artificial neurons Nm assigned the words Wm semantically corresponding to the original words classified as the monosemy belong to the artificial neurons Nms.

Therefore, the output values of the artificial neurons Nh are considerably increased as compared with the output values of the artificial neurons Nl.

As a result, the output values of the artificial neurons Nh is kept high for a period of time as compared with the output values of the artificial neurons Nl.

Accordingly, though each of the original words classified as the polysemy linguistically corresponds to a plurality of words of the second language, the words Wp assigned to the artificial neurons Nh can be correctly adopted as the translated language.

Thereafter, the grammar and the inflection of the second language are analyzed in the translation means to correctly make up the translated sentence from a series of words Wp, Wm of the second language adopted by the processing means.

Accordingly, the translated sentence can be correctly made up.

The third object is achieved by the provision of a method for implementing association of a pattern in a translated sentence of a second language in a artificial neural network in which a plurality of artificial neurons are interconnected through links, an output value of an artificial neuron Nl depends on a value of an external input provided to the artificial neuron Nl and output values of the other artificial neurons interconnected with the artificial neuron Nl through the links, and the output values of all the artificial neurons are determined after the convergence of the output values, comprising the steps of:

selecting a group of artificial neurons Ns of which the arrangement indicates a pattern to be associated by the artificial neural network;

providing an external input Ip, one after another, to each of the artificial neurons Ns to increase the output values of the artificial neurons Ns, the external input Ip provided to each of the artificial neurons Ns being stored therein, and the value of the external input Ip previously stored in the artificial neurons Ns being uniformly reduced to provide again to each of the artificial neurons Ns as past records each time the external input Ip is provided to each of the artificial neurons Ns;

repeatedly converging the output values of all the artificial neurons each time the external input Ip is provided to each of the artificial neurons Ns;

associating the pattern with the arrangement of the artificial neurons Ns of which the output values are high.

In the above seeps, the external input Ip is provided, one after another, to each of the artificial neurons Ns of which the arrangement indicates a pattern to be associated in the artificial neural network. In other words, a series of partial items of information are fragmentarily provided to the artificial neurons Ns. In addition, the external input Ip provided to each of the artificial neurons Ns is stored therein, and the value of the external input Ip previously stored in the artificial neurons Ns is uniformly reduced to provide again to each of the artificial neurons Ns as past records each time the external input Ip is provided to each of the artificial neurons Ns.

Therefore, the external input Ip provided to each of the artificial neurons Ns is not eliminated as noise, regardless of whether a series of partial items of information are fragmentarily provided to the artificial neurons Ns in the artificial network.

Accordingly, the pattern which is desired to be associated by the artificial neural network can be reliably associated because the external input Ip previously stored in the artificial neurons Ns is provided again to each of the artificial neurons Ns as past records.

Moreover, even though noise is stored once in the artificial neural network, the noise is substantially eliminated in the result because the strength of the noise is gradually weakened as the output values of the artificial neurons Ns are renewed.

The fourth object is achieved by the provision of a method for implementing association of a pattern in an artificial neural network in which a plurality of artificial neurons are interconnected through links with weights, each of the artificial neurons provides an output value, and a pattern A is initially associated with the arrangement of the artificial neurons with a high output value, comprising the steps of:

defining an output value $O_j$ of an artificial neuron j receiving an external input $I_j$, (a) the output value $O_j$ being varied according to a monotonic increasing function $f(net_j)$ with upper and lower limits H, L as is formulated by an equation (1), $$O_j = F(net_j), \quad (1)$$

(b) a value of a variable $net_j$ depending on a value of an external input $I_j$ provided to the artificial neuron j, output values $O_i$ of the other artificial neurons i interconnected with the artificial neuron j through the links with weights $W_{ji}$, and the weights $W_{ji}$, as is formulated by an equation (2)

$$net_j = \sum_i W_{ji} O_i + I_j, \quad (2)$$

(c) the value of the monotonic increasing function $f(net_j)$ reaching the upper limit H when $I_j$ is a prescribed high value, and
(d) the value of the monotonic increasing function $f(net_j)$ reaching the lower limit L when $I_j$ is a prescribed low value;

defining an output value $O_j$ of an artificial neuron j receiving no external input $I_j$, (a) the output value $O_j$ being varied according to another monotonic increasing function $g(net_j)$ with upper and lower limits h, l (L<l<h<H) as is formulated by an equation (3), $$O_j = g(net_j), \text{ and} \quad (3)$$

(b) a value of a variable $net_j$ depending on output values $O_i$ of the other artificial neurons i interconnected with the artificial neuron j through the links with weights $W_{ji}$ and the weights $W_{ji}$, as is formulated by an equation (4)

$$net_j = \sum_i W_{ji} O_i, \quad (4)$$

providing an external input $I_k$ with a high value to an artificial neuron k to converge the output values of the artificial neurons according to the equations (1) to (4), (a) an output value $O_k = f(net_k)$ of the artificial neuron k being higher than the upper limit h of the function $g(net_j)$ according to the equations (1) and (2),
(b) output values $O_m = g(net_m)$ of artificial neurons m other than the artificial neuron k being considerably varied according to the equations (3) and (4), and
(c) the arrangement of the artificial neurons with the high output value indicating a pattern B which differs from the pattern A; and associating the pattern B with the arrangement of the artificial neurons with the high output value.

In the above step, when a high external input $I_k$ is provided to an artificial neuron k, the output value $O_k$ is provided to the other artificial neurons m interconnected with the artificial neuron k according to the equations (1) and (2). In this case, the output value $O_k$ is higher than the upper limit h because the external input $I_k$ provided to the artificial neuron k is high. Therefore, the other artificial neurons m receives the high output value $O_k$. Therefore, the output values of the other artificial neurons m are considerably varied according to the equations (3) and (4). As a result, the pattern indicated by the output values of the artificial neurons is changed from pattern A to the pattern B.

Accordingly, even though the pattern A is stably associated, the pattern A can compulsorily changed to the pattern B by utilizing two types of functions $f(net_j)$ and $g(net_j)$ of which the upper limits differ from each other.

Moreover, the fourth object is achieved by the provision of a method for implementing association of a pattern in an artificial neural network in which a plurality of artificial neurons are interconnected through links with weights, each artificial neuron provides an output value, and a pattern A is initially associated with the arrangement of the artificial neurons with a high output value, comprising the steps of:

defining an output value $O_j$ of an artificial neuron j regardless of whether or not the artificial neuron j receives an external input $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and
(b) a value of a variable $net_j$ depending on a value of an external input $I_j$ provided to the artificial neuron j, output values $O_i$ of the other artificial neurons i interconnected with the artificial neuron j through the links with weights $W_{ji}$, and the weights $W_{ji}$, as is formulated by an equation (3)

$$net_j = \sum_i W_{ji}O_i + I_j \qquad (3)$$

wherein the value of the external input $I_j$ equals zero when the artificial neuron j receives no external input;

providing an external input $I_k$ with a high value to an artificial neuron k and providing an external input value $I_p$ with a low value to an artificial neuron p to converge the output values of the artificial neurons according to the equations (1) and (3), (a) an output value $O_k = F(net_k)$ of the artificial neuron k being higher than a value h(O) according to the equations (1) and (3), (b) an output value $O_p = F(net_p)$ of the artificial neuron p being lower than a value l(O) according to the equations (1) and (3), (c) the output values of the artificial neurons other than the artificial neurons k, p being considerably varied according to the equations (1) and (3), and (d) the arrangement of the artificial neurons with high output values indicating a pattern B which differs from the pattern A; and associating the pattern B with the arrangement of the artificial neurons with the high output values.

In the above steps, the output values of the artificial neurons k, p are adjusted by the values of the external input $I_k$, $I_p$ provided to the artificial neurons k, p. Therefore, the influence exerted on the output values of the other artificial neurons can be controlled.

Accordingly, even though the pattern A is stably associated, the pattern A can adjustably changed to the pattern B by adjusting the values of the external inputs.

In addition, the third and fourth objects are achieved by the provision of a method for implementing association of a pattern in an artificial neural network in which a plurality of artificial neurons are interconnected through links with weight parameters, each artificial neuron provides an output value, and a pattern A is initially associated with the arrangement of the artificial neurons with a high output value comprising the steps of:

defining an output value $O_j$ off an artificial neuron j receiving an external input $I_j$, (a) the output value $O_j$ being varied according to a monotonic increasing function $f(net_j)$ with upper and lower limits H, L as is formulated by an equation (1).

$$O_j = F(net_j), \qquad (1)$$

(b) a value of a variable $net_j$ depending on a value of an external input $I_j$ provided to the artificial neuron j, output values $O_i$ of the other artificial neurons i interconnected with the artificial neuron j through the links with weights $W_{ji}$, and the weights $W_{ji}$, as is formulated by an equation (2)

$$net_j = \sum_i W_{ji}O_i + I_j, \qquad (2)$$

(c) the value of the monotonic increasing function $f(net_j)$ reaching the upper limit H when $I_j$ is a prescribed high value, and (d) the value of the monotonic increasing function $f(net_j)$ reaching the lower limit L when $I_j$ is a prescribed low value;

defining an output value $O_j$ of an artificial neuron j receiving no external input $I_j$, (a) the output value $O_j$ being varied according to another monotonic increasing function $g(net_j)$ with upper and lower limits h, l (L<l<h<H) as is formulated by an equation (3)

$$O_j = g(net_j), \text{ and} \qquad (3)$$

(b) a value of a variable $net_j$ depending on output values $O_i$ of the other artificial neurons i interconnected with the artificial neuron j through the links with weights $W_{ji}$ and the weights $W_{ji}$, as is formulated by an equation (4)

$$net_j = \sum_i W_{ji}O_i, \qquad (4)$$

selecting a group of artificial neurons Ns of which the arrangement indicates a pattern B to be associated by the artificial neural network;

providing an external input Ip with a high value, one after another, to each of the artificial neurons Ns to increase the output values of the artificial neurons Ns to above the high limit h, the external input Ip provided to each of the artificial neurons Ns being stored therein, and the value of the external input Ip previously stored in the artificial neurons Ns being uniformly reduced to provide again to each of the artificial neurons Ns as past records each time the external input Ip is provided to each of the artificial neurons Ns;

repeatedly converging the output values of all the is artificial neurons according to the equations (1) to (4) each time the external input Ip is provided to each of the artificial neurons Ns; and associating the pattern B with the arrangement of the artificial neurons Ns of which the output values are high.

In the above steps, the external input Ip is provided, one after another, to each of the artificial neurons Ns of which the arrangement indicates a pattern to be associated in the artificial neural network. Moreover, the external input Ip provided to each of the artificial neurons Ns is stored therein, and the value of the external input Ip previously stored in the artificial neurons Ns is uniformly reduced to provide again to each of the artificial neurons Ns as past records each time the external input Ip is provided to each of the artificial neurons Ns.

Therefore, the external input Ip provided to each of the artificial neurons Ns is not eliminated as noise.

In addition, when the external input Ip are provided to the artificial neurons Ns, the output values of the artificial neurons Ns become high according to the equations (1) and (2). Therefore, the influence exerted on the other artificial neurons which receive no external input is large so that the output values of the other artificial neurons are considerably varied.

Accordingly, even though the pattern A is stably associated, the pattern A can reliably changed to the pattern B by providing the reduced external input Ip many times and by utilizing two types of functions $f(net_j)$ and $g(net_j)$ of which the upper limites differ from each other.

Moreover, the third and fourth objects are achieved by the provision of a method for implementing association of a pattern in an artificial neural network in which a plurality of artificial neurons are interconnected through links with weights, each artificial neuron provides an output value, and a pattern A is initially associated with the arrangement of the artificial neurons with a high output value, comprising the steps of:

defining an output value $O_j$ of an artificial neuron j regardless of whether or not the artificial neuron j receives an external input $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and (b) a value of a variable $net_j$ depending on a value $I_j$ of an external input provided to the artificial neuron j, output values $O_i$ of the other artificial neurons i interconnected with the artificial neuron j through the links weighted by weight parameters $W_{ji}$, and the weight parameters $W_{ji}$, as is formulated by an equation (3)

$$net_j = \sum_i W_{ji} O_i + I_j \quad (3)$$

wherein the external input value $I_j$ equals zero when the artificial neuron j receives no external input:

selecting a group of artificial neurons Ns of which the arrangement indicates a pattern B differing from the pattern A;

providing an external input Ip with a high value, one after another, to each of the artificial neurons Ns to increase the output values of the artificial neurons Ns to above the high limit h, the external input Ip provided to each of the artificial neurons Ns being stored therein, and the value of the external input Ip previously stored in the artificial neurons Ns being uniformly reduced to provide again to each of the artificial neurons Ns as past records each time the external input Ip is provided to each of the artificial neurons Ns;

repeatedly converging the output values of all the artificial neurons according to the equations (1) to (4) each time the external input Ip is provided to each of the artificial neurons Ns; and associating the pattern B with the arrangement of the artificial neurons Ns of which the output values are high.

In the above steps, the external input Ip provided to each of the artificial neurons Ns is not eliminated as noise in the same manner.

In addition, when the external input Ip are provided to each of the artificial neurons Ns, the output values of the artificial neurons Ns become high according to the equations (1) and (3) in the same manner. Therefore, the influence exerted on the other artificial neurons which receive no external input is large so that the output values of the other artificial neurons are considerably varied.

Accordingly, the desired pattern B can be reliably associated by utilizing the past records of the external inputs.

In addition, even though the pattern A is stably associated, the pattern A can adjustably changed to the pattern B by adjusting the values of the external inputs.

BRIEF DESCRIPTION OF THE DRAWINGS

FIG. 4a is an explanatory diagram of picture elements, showing a second conventional example.

FIG. 4b shows two types of patterns indicated by the picture elements shown in FIG. 4a.

FIG. 4c is an explanatory diagram of an artificial neural network in which artificial neurons are interconnected through weighted links to associate one of the patterns shown in FIG. 4b, the artificial neurons being assigned to the picture elements shown in FIG. 4a.

DETAILED DESCRIPTION OF THE PREFERRED EMBODIMENTS

The preferred embodiments according to the present invention are described with reference to drawings.

Figure 1:
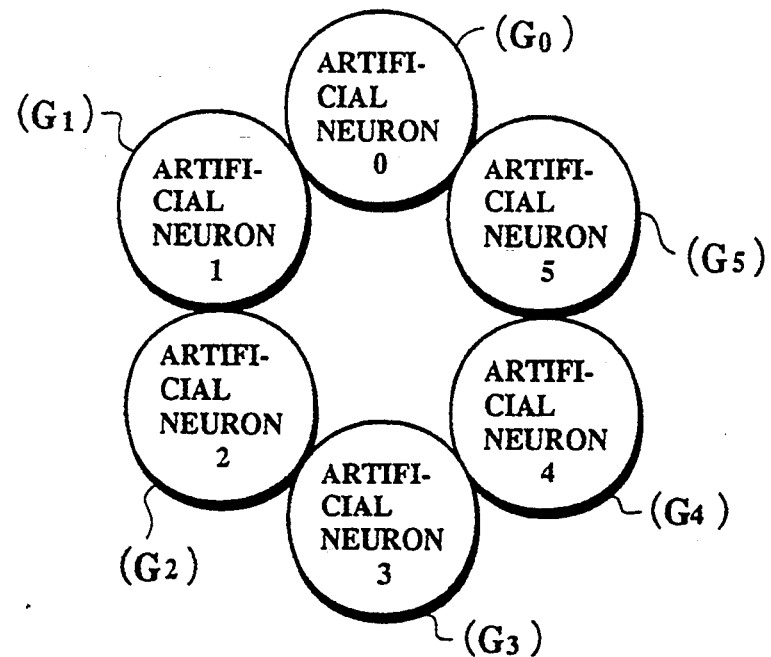
FIG. 1 is an explanatory diagram of picture elements arranged in a hexagonal form, showing a first conventional example.

FIGS. 1 to 3 are again used to explain the embodiments.

Figure 2:
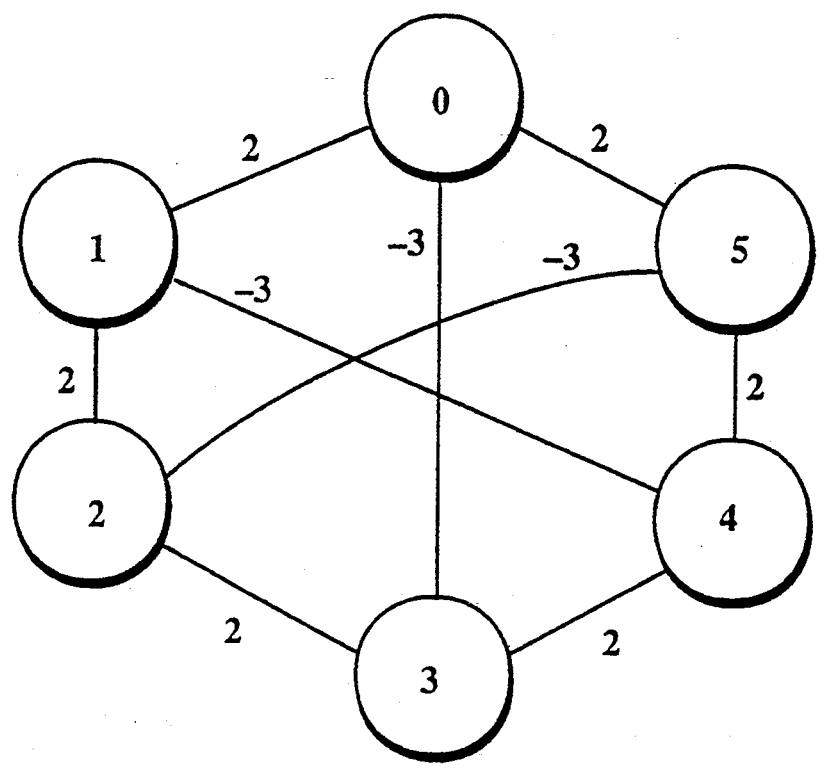
FIG. 2 is an explanatory diagram of an artificial neural network in which artificial neurons are interconnected through weighted links, the artificial neurons being assigned to the picture elements shown in FIG. 1.
Figure 6:
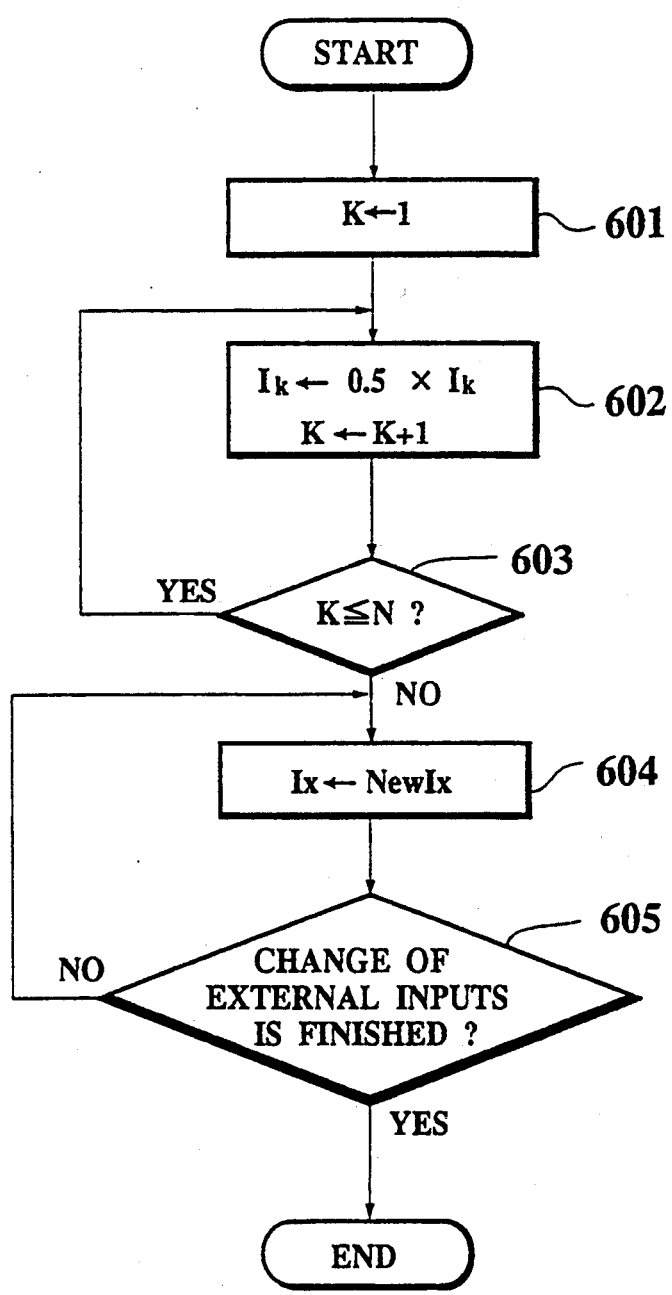
FIG. 6 is a flowchart showing a method for implementing association in the artificial neural network shown in FIG. 2 according to a first embodiment of the present invention.

FIG. 6 is a flowchart showing a method for implementing association in the artificial neural network shown in FIG. 2 according to a first embodiment of the present invention.

In this embodiment, a request to make a specific artificial neuron active or inactive is given from the outside in the artificial neural network shown in FIG. 2. The request is expressed as the combination of the neuron number and the request such as a symbol (x, NewIx). That is, x designates the artificial neuron number, and NewIx represents a value of an external input provided to the artificial neuron x. Accordingly, when the output of the artificial neuron x must be increased to a high value, NewIx set at a positive value is given to the artificial neuron x, while NewIx set at a negative value is given to the artificial neuron x when the output of the artificial neuron x must be decreased to a low value. In this case, because requests to a plurality of artificial neurons are made at one time, it is necessary to list these requests. For example, when external inputs designated by NewIx, NewIy, and NewIz respectively are assigned to artificial neurons x, y, z respectively, the requests are ordered to an artificial neural network in the form of a list such as (x, NewIx), (y, NewIy), (z, NewIz).

Specifically, when such requests are given to the neural network, all the external inputs Ik stored in the artificial neurons are reduced by half in steps 601 through 603, as shown in the flowchart in FIG. 6. Thereafter, in steps 604 and 605, new external inputs are set to give new requests to the artificial neurons.

Figure 3:
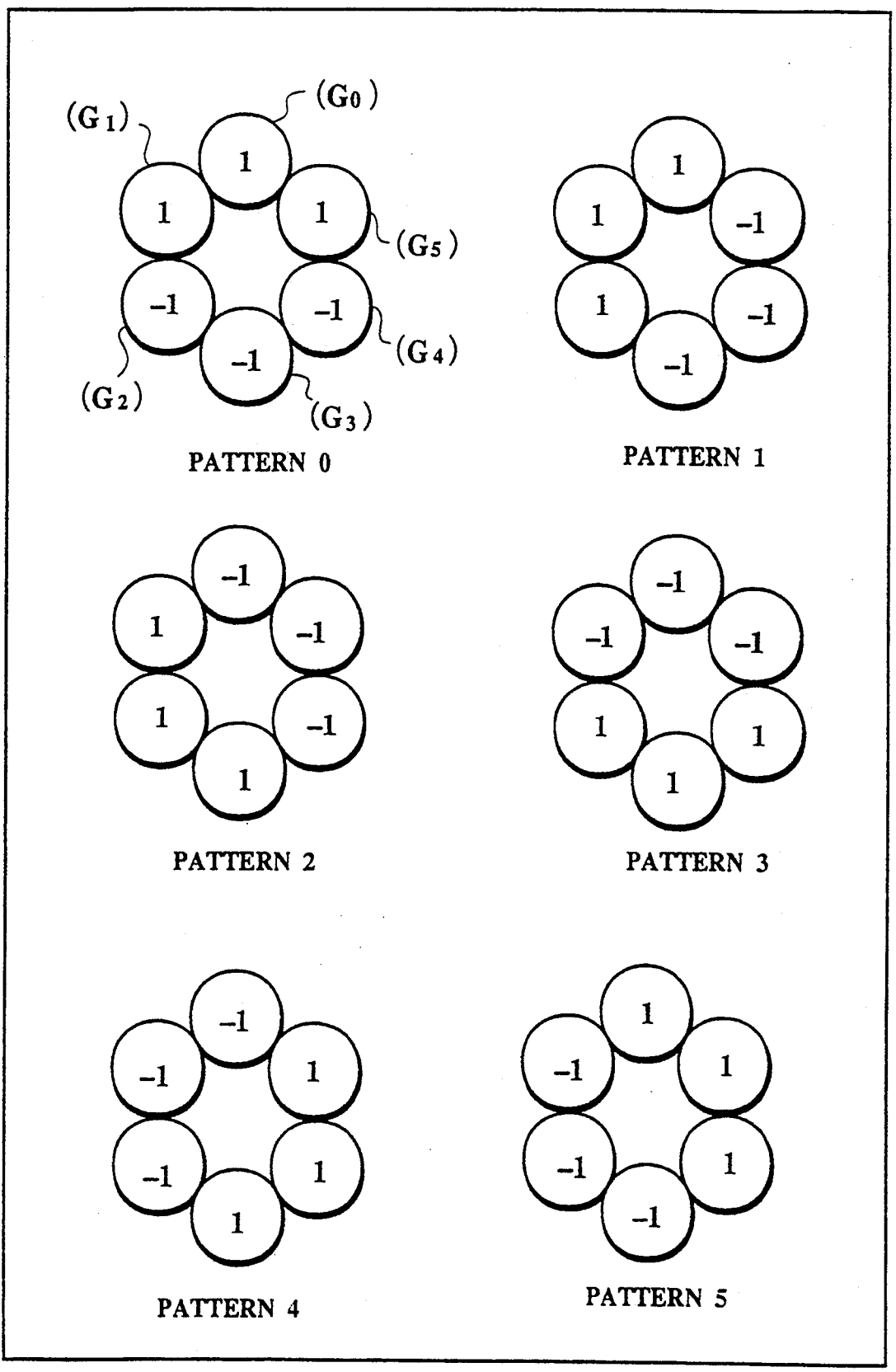
FIG. 3 shows six types of patterns associated by the artificial neural network shown in FIG. 2. patterns to be provided by the network shown in FIG. 2.

Table 2 shows output values provided by the artificial neurons when an external input is provided to each of the artificial neurons in the artificial neural network being shown in FIG. 2 one after another. The external inputs previously provided in the same order as in Table 1 is reduced to half as shown in FIG. 6 each time the external input is provided to each of the artificial neurons.

at the fifth time (5). Moreover, the other external inputs are also provided and reduced in the same manner. As referred to the first conventional example, the association of the pattern 3 or 4 shown in FIG. 3 is desired in the time interval between the time (0) to (3) in this embodiment, and the association of the pattern 1 or 0 is desired in the time interval between the time (4) to (8) in this embodiment.

Figure 7:
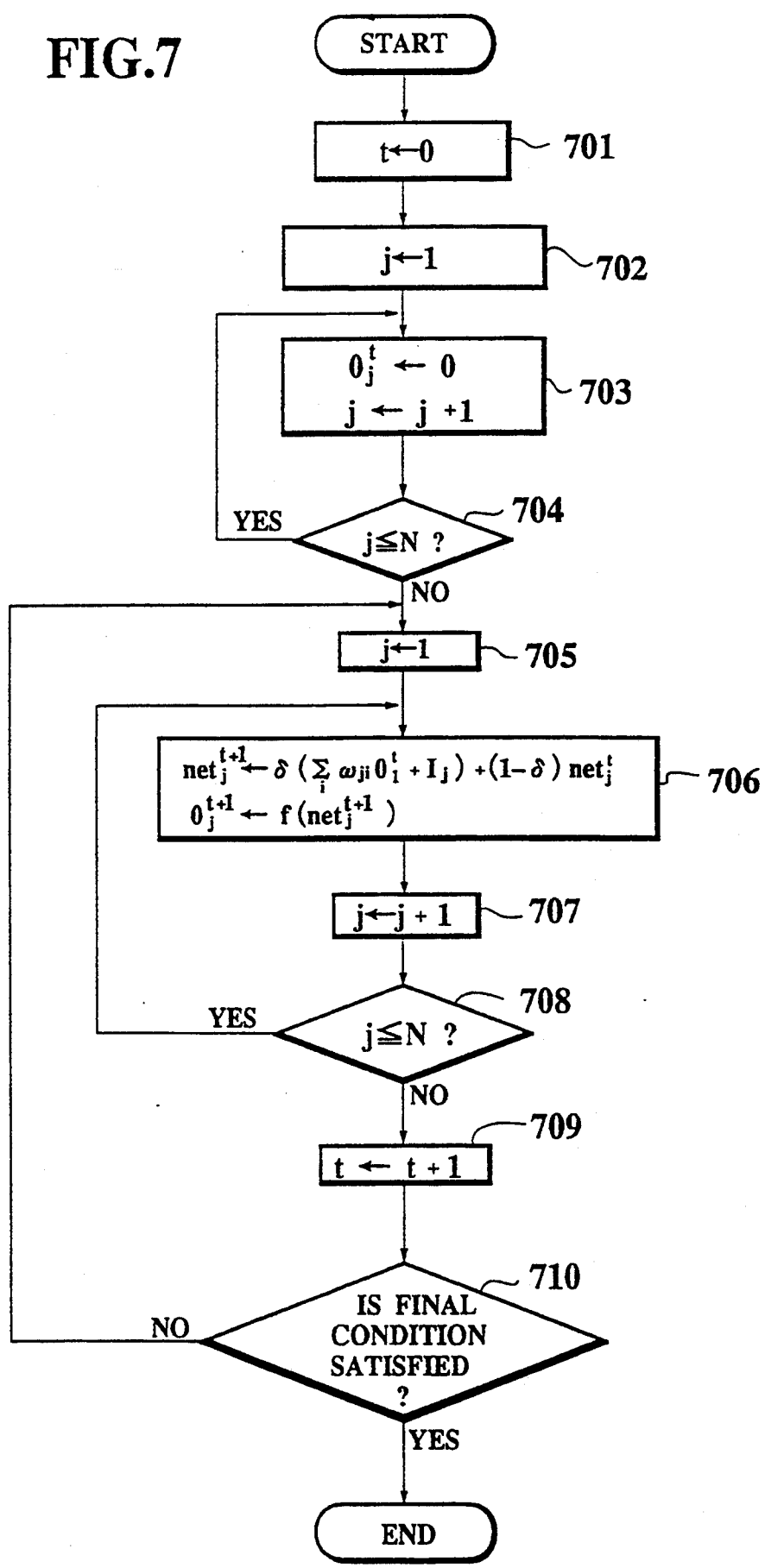
FIG. 7 is a flowchart of an operational method for calculating output values of artificial neurons each time the artificial neurons receive external inputs according to a procedure shown in FIG. 6.

FIG. 7 is a flowchart of an operational method for calculating output values of artificial neurons each time the artificial neurons receive the external inputs according to a procedure shown in FIG. 6.

First, a symbol t showing a period of execution is set at 0 to initialize an operational procedure in a step 701. The symbol t shows the number of times the output values of the artificial neurons are renewed and has no relation to the number of times the external inputs are changed.

Next, all the output values of the artificial neurons are initialized at 0 in steps 702 to 704. And, all the output values of artificial neurons are then determined in steps 705 to 708 according to the following equations:

$$O_j^{t+1} = f(net_j^{t+1}) \quad (3)$$

$$net_j^{t+1} = \delta \left( \sum_{i=1}^{N} W_{ji} O_i^t + I_j^t \right) + (1 - \delta) net_j^t \quad (4)$$

These equations (3), (4) are the same as the equations (1), (2). Each external input $I_j^t$ in the equation (4) is reduced by half each time a new external input is provided to the artificial neural network as shown in Table 2.

The number t is incremented by 1. In cases where a satisfactory final condition can be obtained at a step 710, the execution is ended. In cases where this condition is not obtained at a step 710, the operational procedure from the step 705 to the step 710 are repeated. When all the output values $O_j^{t+1}$ are converged, the final condition is satisfied so that the converging process of the output values is finished.

The patterns of the output values $O_0$ to $O_5$ of the artificial neurons 0 to 5 shown in the lower half of Table 2 are as follows:

TABLE 2

| | Number of Times | | | | | | | | |
|---|---|---|---|---|---|---|---|---|---|
| | 0 | 1 | 2 | 3 | 4 | 5 | 6 | 7 | 8 |
| $I_0$ | 0 | 0 | 0 | 0 | 0 | 0 | I | 0.5I | I |
| $I_1$ | 0 | 0 | 0 | 0 | I | 0.5I | 0.25I | .125I | I |
| $I_2$ | I | 0.5I | 0.25I | 0.125I | 0.063I | I | 0.5I | I | 0.5I |
| $I_3$ | 0 | I | 0.5I | 0.25I | 0.125I | .063I | .031I | .016I | .008I |
| $I_4$ | 0 | 0 | I | 0.5I | 0.25I | 0.125I | .063I | .031I | .016I |
| $I_5$ | 0 | 0 | 0 | I | 0.5I | 0.25I | .125I | .063I | I |
| $O_0$ | −1. | −1 | −1. | −1. | −0.99 | −0.99 | 1. | 1. | 1. |
| $O_1$ | 1. | 0.99 | −1. | −1. | −0.96 | 1. | 1. | 1 | 1. |
| $O_2$ | 1. | 1. | 1. | −0.98 | −0.99 | 1. | 1. | 1. | −0.98 |
| $O_3$ | 1. | 1. | 1. | 1. | 1. | 1. | −0.99 | −0.99 | −1. |
| $O_4$ | −1. | −0.99 | 1. | 1. | 1. | −0.98 | −1. | −1. | −0.99 |
| $O_5$ | −1. | −1. | −1. | 1. | 1. | −1. | −0.98 | −0.99 | 1. |

In Table 2, on condition that values of external inputs $I_0$ to $I_5$ provided to artificial neurons 0 to 5 are positive, the external input $I_2$ provided to the artificial neuron 2 at the zeroth time (0) (designated by 0 in the top column) is successively reduced by half each time the external input is provided to the artificial neurons at the first (1), second (2), third (3) and fourth times (4), and the external input $I_2$ is then changed into a new input $I_2$

| the number of times | the number of times |
|---|---|
| (0) → Pattern 2, | (4) → Pattern 4, |
| (1) → Pattern 2, | (5) → Pattern 2, |
| (2) → Pattern 3, | (6) → Pattern 1, |
| (3) → Pattern 4, | (7) → Pattern 1, |

| the number of times | the number of times |
|---|---|
| | (8) → Pattern 0 |

Therefore, in this embodiment, the associated patterns following the change of external inputs up to the third time (3) are the same as those in the first conventional example described in Table 1.

However, the patterns associated in the time interval from the fourth time (4) to the eighth time (8) differ from those in the first conventional example. In detail, an external input $I_1$ is provided to the artificial neuron 1 at the fourth time (4). At this time, because the pattern to be associated with the external input $I_1$ significantly differs from the pattern 4 associated at the third time (3), the external input $I_1$ at the fourth time (4) is regarded as noise. However, when an external input $I_2$ is provided to the artificial neuron 2 at the fifth time (5), the pattern 2 is associated because another external input $I_1$ with a half value 0.5 I is simultaneously provided to the artificial neuron 1. Moreover, because an external input $I_0$ is provided to the artificial neuron 0 at the sixth time (6), the pattern 1 is associated because another external input $I_2$ with a half value 0.5 I is simultaneously provided to the artificial neuron 2 and still another external input $I_1$ with a value 0.25 I is simultaneously provided to the artificial neuron 1. Therefore, it becomes possible to catch up with the change of the patterns to be associated with the external inputs. The reason why the change of the associated patterns can be implemented is that the artificial neural network according to the present invention stores the external inputs as a series of past records.

As mentioned above, in the first embodiment, even when each of partial items of information which designate a pattern significantly differing from another pattern already associated in the artificial neural network are provided to an artificial neuron, the partial items of information provided to the artificial neurons in past times are gradually reduced and stored in the artificial neurons to again provide the artificial neurons without being eliminated as noise.

Accordingly, the desired pattern can be reliably associated with the past records of the partial items of information. Moreover, even though noise is unintentionally provided to an artificial neuron as an external input and is once stored in the artificial neural network, the noise is substantially eliminated in the result because the degree of the noise is gradually weakened each time the external inputs are provided to the artificial neurons and the output values of the artificial neurons are renewed.

In the first embodiment, although each of the external inputs is decreased each time the output values of the artificial neurons are renewed, it is preferable that the external input be decreased with the lapse of time and with no relation to the renew&l of the output value. Moreover, in this embodiment, although the external inputs are decreased by multiplying each external input by a numerical value less than 1 (for example, 0.5), it is preferable that a constant value with the same sign as each external input be subtracted from the external input value or that a numerical value obtained according to a monotonic increasing function be utilized as the external input value.

Furthermore, when a new external input is provided to an artificial neuron, the value of the new external input is set at I in the first embodiment. However, it is preferable that the value of the new external input be determined by adding the value of the latest renewal time with a value I. Although each initial value of the external inputs is I in common in the first embodiment, it is preferable that the value of the external input be changed each time the external input is provided to the artificial neuron.

According to the method of the present invention, because the external inputs resulting from the past records are stored and gradually reduced to again provide to the artificial neurons, a desired pattern can be efficiently associated even when each partial item of information is suddenly changed with time.

Next, a second embodiment of the present invention will be explained.

Figure 8:
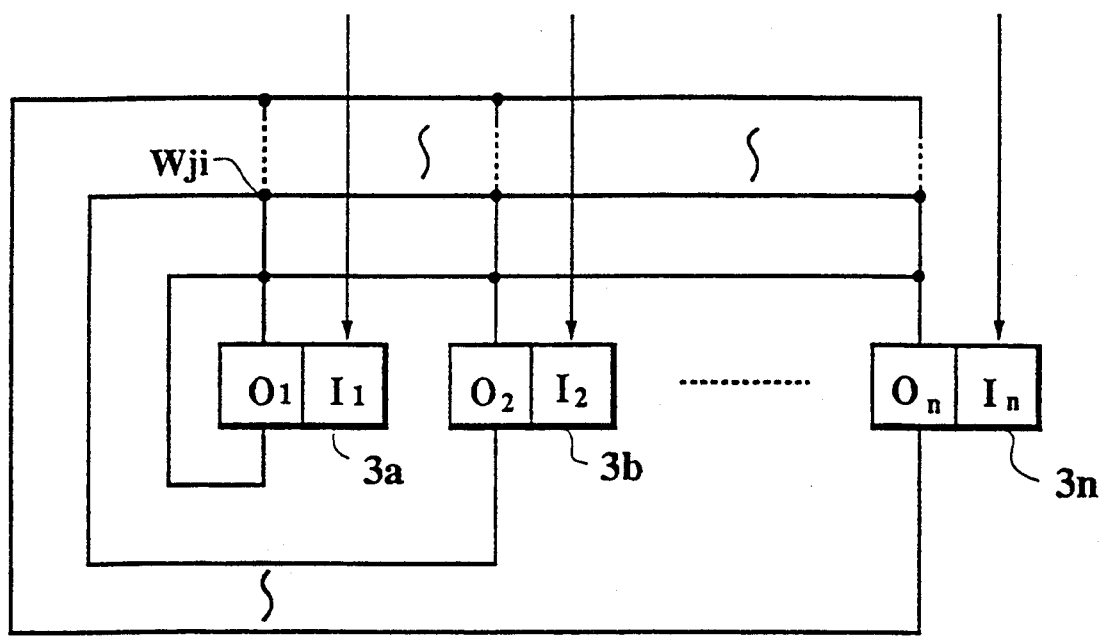
FIG. 8 is a diagram showing a schematic configuration of an apparatus to embody a method for implementing association in an artificial neural network according to a second embodiment of the present invention.

FIG. 8 is a diagram showing a schematic configuration of an apparatus to embody a method for implementing association in an artificial neural network according to a second embodiment of the present invention.

As shown in FIG. 8, this apparatus is generally provided with:

a plurality of artificial neurons $3a$, $3b$, to $3n$ for providing output values $O_j$ (j=1 to n), each artificial neuron j receiving an external input value $I_j$; and a plurality of links for respectively interconnecting one artificial neuron with another artificial neuron, each link being weighted by a prescribed weight parameter $W_{ji}$.

In the above configuration of the apparatus, a first modification of the second embodiment is first described to easily understand a second modification, as follows.

Figure 9:
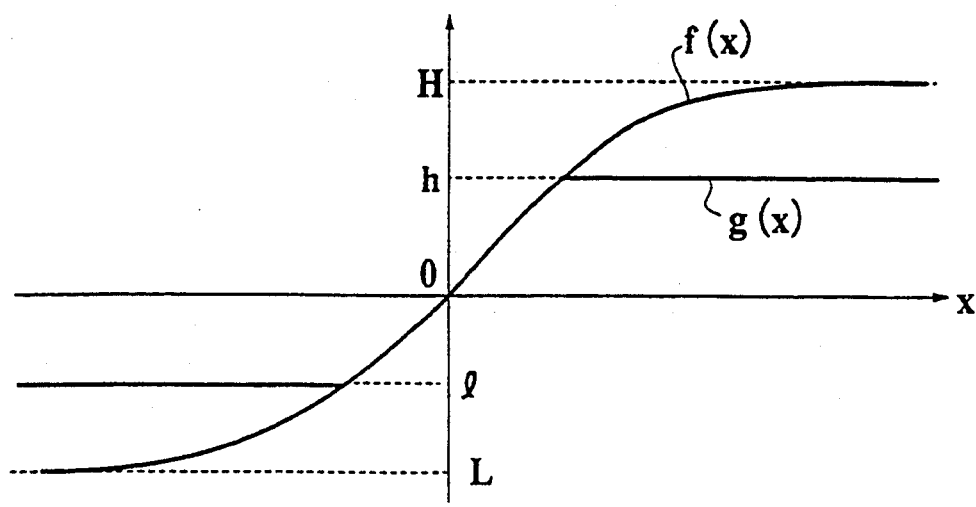
FIG. 9 is a graphic view to show input/output functions f(x), g(x) according to a first modification of a second embodiment.

The output value $O_j$ of each artificial neuron j is calculated when the external input value Ij does not equal 0, as follows:

$$O_j = f(net_j) \quad (5)$$

$$net_j = \sum_{i=1}^{n} W_{ji}O_i + I_j \quad (6)$$

wherein a symbol f designates a monotonic increasing function with upper and lower limits as shown in FIG. 9. The upper limit of the monotonic increasing function f is H, and the lower limit of the function f is L (H>L).

On the other hand, when the external input value Ij equal 0, the output value $O_j$ of each artificial neuron j is calculated as follows:

$$O_j = g(net_j) \quad (7)$$

$$net_j = \sum_{i=1}^{n} W_{ji}O_i \quad (8)$$

wherein a symbol g is also a monotonic increasing function as shown in FIG. 9, and the upper limit of $g(net_j)$ is h (h<H), and the lower limit of $g(net_j)$ is l (h>l>L). The relation between the above functions $f(net_j)$, $g(net_j)$ is as follows. An artificial neuron receiving the external input is allowed to output a higher output value $O_j$ (h<$O_j$≦H) than an artificial neuron receiving no external input.

For example, the function g(x) can be designated as shown in FIG. 9, $$g(x) = \begin{cases} h \ldots & f(x) > h \\ f(x) \ldots & l \leq f(x) \leq h \\ l \ldots & f(x) < l \end{cases} \quad (9)$$

wherein x is a variable x indicating $net_j$.

That is, the feature of the first modification is that the upper and lower limits are constant values.

According to the equations (5) to (9), the process shown in FIG. 7 is implemented until all the output values of the artificial neurons 3a, 3b, to 3n are converged.

In this case, an artificial neuron k receiving the external input $I_k$ can be strongly activated because the output value of the artificial neuron k is calculated according to the equations (5), (6) to output a higher output value $O_k$ ($h < O_k \leq H$) than another artificial neuron receiving no external input.

Therefore, the influence of the artificial neuron k on the other artificial neurons becomes large so that the influence of the external input is strongly exerted on the apparatus. In other words, the output values of the artificial neurons 3a, 3b, to 3n can be rapidly and correctly converged.

Accordingly, a desired pattern can be reliably associated.

Next, a second modification of the second embodiment is described. The feature of the second modification is that the upper and lower limits are variable values depending on a value of an external input.

Figure 10:
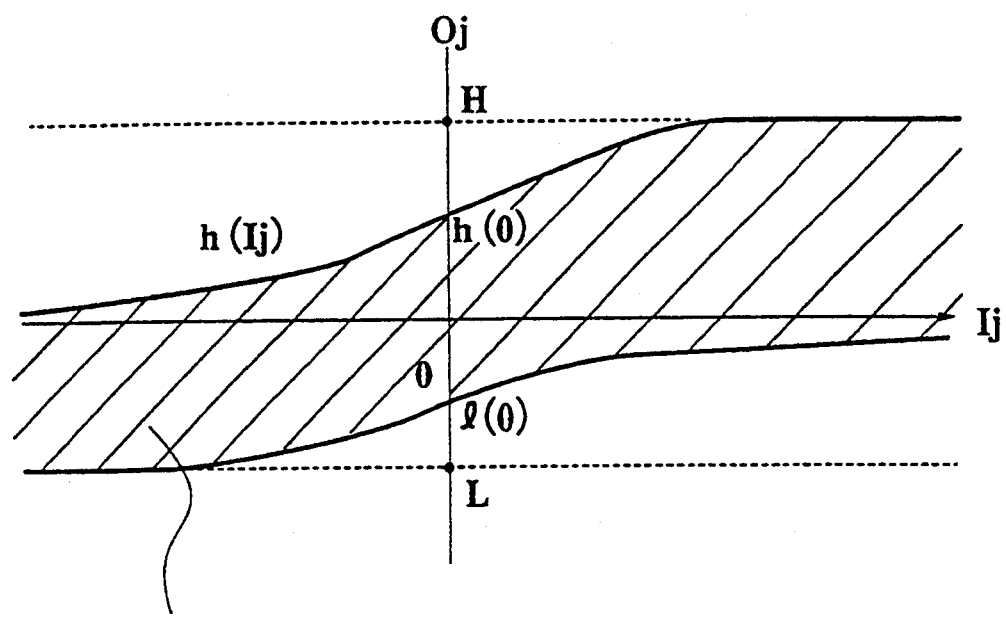
FIG. 10 is a graphic view to show upper and low limits $h(I_j)$, $l(I_j)$ according to a second modification of a second embodiment.

Generally, as shown in FIG. 10, regardless of whether or not Ij is 0, upper limits of the input/output functions f(x), g(x) are designated in common by a monotonic increasing function h(Ij) of which the value increases as a value of the external input Ij provided to the artificial neuron j becomes higher. In the same manner, lower limits of the input/output functions f(x), g(x) are designated in common by a monotonic increasing function l(Ij). The reason why the above functions h(Ij), l(Ij) are utilized is to strictly control the influence of the artificial neuron j on the other artificial neurons by depending the influence on the external input value Ij. That is, in cases where the external input is adjusted to a high value Ij, the output value $O_j$ ($l(Ij) \leq O_j \leq h(Ij)$) of the artificial neuron j can become high so that the influence on the other artificial neurons also becomes large.

The input/output functions f(x), g(x) utilized in the first modification are replaced with a function F(x) as follows:

$$F(x) = \begin{cases} h(Ij) \ldots & f(x) > h(Ij) \\ f(x) \ldots & l(Ij) \leq f(x) \leq h(Ij) \\ l(Ij) \ldots & f(x) < l(Ij) \end{cases} \quad (10)$$

wherein j designates an artificial neuron number, the function h(Ij) and l(Ij) are respectively monotonic increasing functions with respect to $I_j$ with the following range.

$$L \leq l(Ij) < (h(Ij) \leq H \quad (11)$$

Therefore, the output values $O_j$ of the artificial neurons are converged according to equations (12), (13).

$$O_j = F(net_j) \quad (12)$$

$$net_j = \sum_{i=1}^{n} W_{ji} O_i + I_j \quad (13)$$

The features of the function F(x) are as follows.

The function F(x) agrees with the function f(x) on condition that the value of the function F(x) is between h(Ij) and l(Ij). In other words, the upper limit of the function F(x) is the function h(Ij) of which the value is specified by the value of the external input $I_j$, and the lower limit of the function F(x) is the function l(Ij) of which the value is specified by the value of the external input $I_j$. Thus, when the external input value Ij is increased, the maximum and minimum values of the output value F(x) provided by the artificial neuron j are also increased.

In addition, in cases where the external input value Ij is provided according to the first embodiment, F(x) is also reduced because the external input value Ij is reduced each time the output values $O_j$ are renewed.

Figure 5:
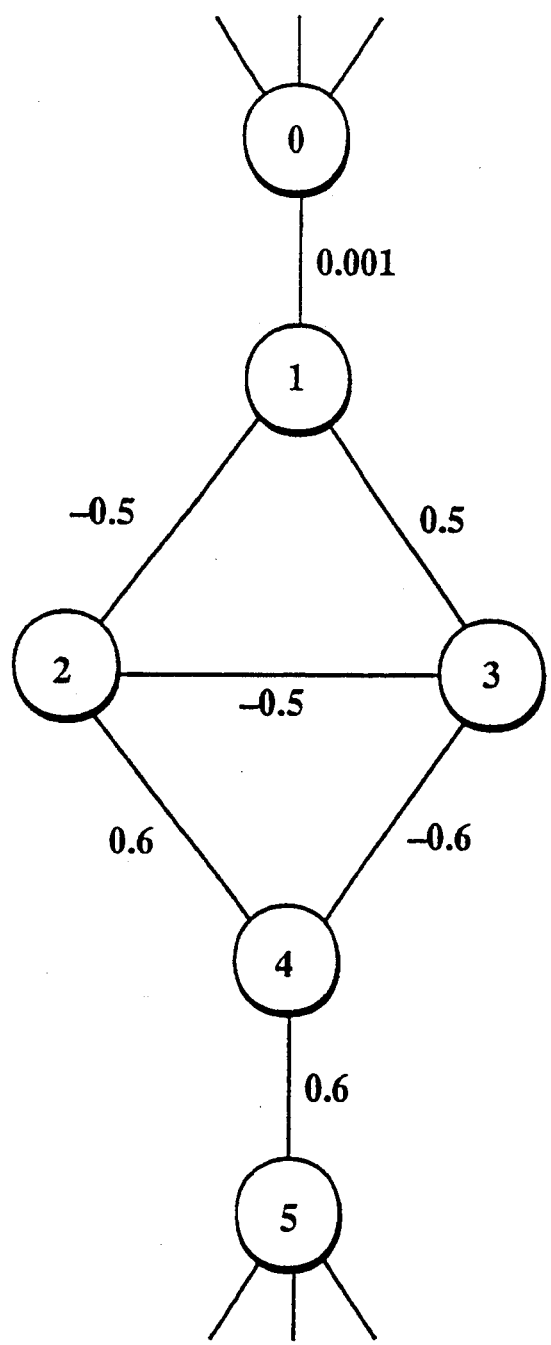
FIG. 5 is an explanatory diagram showing another artificial neural network according to the second example.

Now, returning to the network shown in FIG. 5, the second modification of the second embodiment according to the present invention will be compared with the second conventional example.

First, a case in which the present invention is not used will be explained. In this case, to simplify the description, it is regarded that H equals 1.0 and L equals −1.0. When the artificial neuron 1 receives an output from the artificial neuron 0 in FIG. 5 (in this case, the artificial neurons 1 to 4 receive no external input), although the output of the artificial neuron 0 is decreased by multiplying the weight 0.001 so that the output provided to the artificial neuron 1 becomes small, a positive feedback is given by the artificial neurons 1 to 4. As a result, these artificial neurons 1 to 4 are respectively varied to the following states:

{output value of artificial neuron 1, output value of artificial neuron 2, output value of artificial neuron 3, output value of artificial neuron 4} = {1, −1, 1, −1}

Thereafter, even though an external input 14 being a high positive value is provided to the artificial neuron 4, because the absolute output values of the artificial neurons 2, 3, 4 are very high, the artificial neurons 1 to is 4 can not be varied to a better and more stable state:

{output value of artificial neuron 1, output value of artificial neuron 2, output value of artificial neuron 3, output value of artificial neuron 4} = {−1, 1, −1, 1}

However, in cases where the present invention is applied, the result is as follows. In this case, to simplify the description, an artificial neuron receiving no external input is allowed to output an upper limit h(O)=0.5 or a lower limit l(O)=−0.5, and an artificial neuron j receiving a high value of the external input $I_j$ is allowed to output an upper limit h(Ij)=1.0.

First, because the artificial neurons 1 to 4 receive no external input respectively, the maximum absolute output values of these artificial neurons are limited to 0.5.

Accordingly, these artificial neurons are varied to the following states respectively:

{output value of artificial neuron 1, output value of artificial neuron 2, output value of artificial neuron 3, output value of artificial neuron 4} = {0.5, −0.5, 0.5, −0.5}

Thereafter, when a high value of an external positive input I4 is given to the artificial neuron 4, only the artificial neuron 4 is allowed to have an output value up to 1.

At this time, because the output value of the artificial neuron 4 is a high positive value and the artificial neurons 2, 3 interconnected to the artificial neuron 4 have relatively small output values 0.5, −0.5 compared with the artificial neuron 4, the output values of these artificial neurons 2, 3 is easily varied. Also, the output value of the artificial neuron 1 is varied due to the shift of the output values of these artificial neurons 2, 3. Therefore, the combination of the output values of the artificial neurons 1 to 4 is varied to a better and more stable state as follows:

{output value of artificial neuron 1, output value of artificial neuron 2, output value of artificial neuron 3, output value of artificial neuron 4} = {−0.5, 0.5, −0.5, 1}

Accordingly, the output values of the artificial neurons receiving the external input are allowed to equal the high value h(Ij)=1.0, while the output values of the artificial neurons receiving no external input value are limited to a maximum of h(O)=0.5. Therefore, the better and more stable state can be associated.

Next, pattern recognition implemented by applying the first and second embodiments is described as a third embodiment of the present invention.

Figure 11:
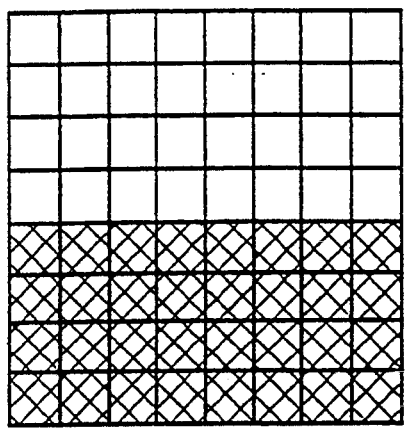
FIGS. 11a to 11c are image patterns to be associated.
Figure 11:
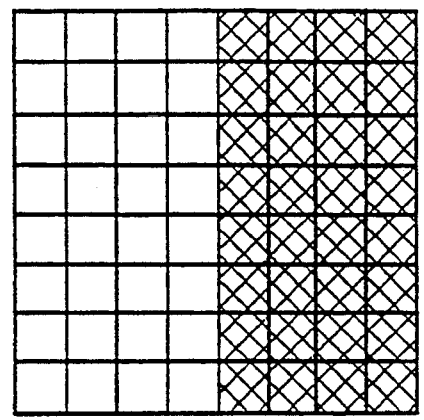
Figure 11:
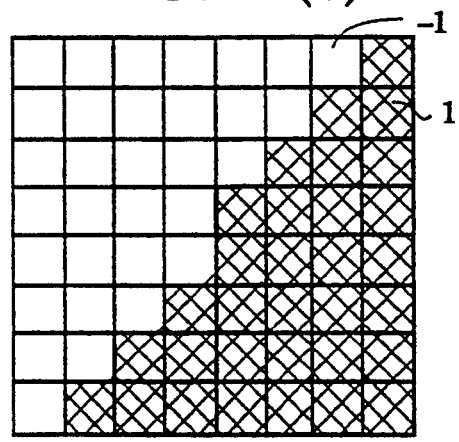

For example, as shown in FIGS. 11a, 11b, 11c, three patterns 0, 1, and 2 respectively consist of sixty-four picture elements, and a method for associating one of the patterns is described.

An output value $O_H$ of artificial neurons assigned to the picture elements colored black is defined as 1, and another output value $O_L$ of artificial neurons assigned to the picture elements colored white is defined as −1.

Moreover, to implement the association of the pattern as shown in FIGS. 11a to 11c, following weights are used:

$$W_{ji} = \sum_s O_j^s O_i^s$$

wherein $O_i^s$ is the output value of the picture element (i=1 to 64) for a pattern s (s=0, 1, or 2).

Figure 12:
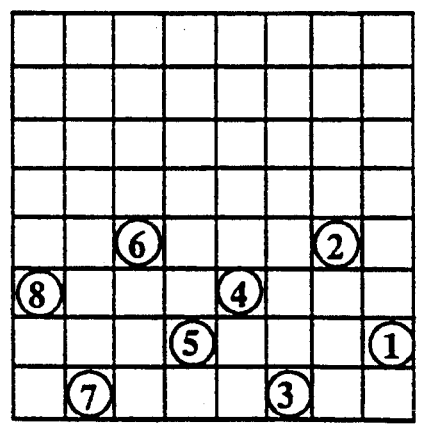
FIG. 12 is a diagram to explain the input order of external inputs.

Now, eight external inputs $I_j=1$ (where j is an integer from 1 to 8) are provided to the artificial neurons 1 to 8 assigned to the prescribed picture elements in a numerical order as shown in FIG. 12 to associate the pattern 0. However, when only the first four external inputs $I_j=1$ are provided to the artificial neurons 1 to 4, it cannot yet be determined which pattern should be associated. Moreover, even when the fifth external input $I_j=1$ is further provided to the artificial neuron 5, which of the patterns 0, 2 should be associated cannot be determined. Therefore, in cases where the artificial neural network is stably determined before the sixth external input is provided to the artificial neuron 6, the artificial neural network can associate either of the patterns 0 and 2 with the same probability.

According to the conventional method, in cases where the artificial neural network has already associated the pattern 2, even though the external inputs are provided to the artificial neurons 6 to 8 to promote the association of the pattern 0, the pattern 2 associated by the artificial neural network is not changed to the pattern 0 because the artificial neural network has been already in a stable state by the provision of the fifth external input. That is, the provision of the external inputs following the fifth external input is ignored.

Therefore, once the artificial neural network is led into the stable state by an incorrect association, it is generally very difficult to correct the association in cases where the conventional method is implemented.

In the conventional technique, the influence of an output value of an artificial neuron receiving an external input on output values of the other artificial neurons is the same as the influence of an output value of an artificial neuron not receiving an external input. Therefore, when an output value of an artificial neuron not receiving an external input is determined to lead the artificial neural network into the stable state, it is very difficult to change the output value of the artificial neuron.

On the other hand, in the present invention, the range of an output value of an artificial neuron receiving an external input is wider than the range of an output value of an artificial neuron not receiving an external input. That is, the output value of the artificial neuron receiving the external input ranges between H (H=1.0) and L (L=−1.0), while the output value of the artificial neuron receiving no external input ranges between h (h=0.5) and l (l=−0.5).

Accordingly, the influence of the output value of the artificial neuron receiving the external input on the output values of the other artificial neurons is larger than that of the output value of the artificial neuron not receiving the external input. Therefore, by providing a suitable external input to a prescribed artificial neuron, it becomes possible to change the output value of the artificial neuron not receiving the external input even when the output value has been already led into the stable state.

As clearly understood from the above explanation, according to the second embodiment of the present invention, the output value of the artificial neuron not receiving the external input is limited to a range narrower than the allowable range for the output value of the artificial neuron receiving the external input.

Therefore, the absolute output value of the artificial neuron not receiving the external input cannot be extremely high, so that the association can be correctly changed to the stable state by the output value of the artificial neuron receiving the external input.

It should be understood that the present invention is not limited to the above embodiments. For example, when each external input is a positive (negative) value, it is possible for the range of the output value of each artificial neuron to be positive (negative).

Next, machine translation implemented by applying the first and second embodiments is described with reference to FIGS. 13 to 14 as a fourth embodiment of the present invention.

Figure 13:
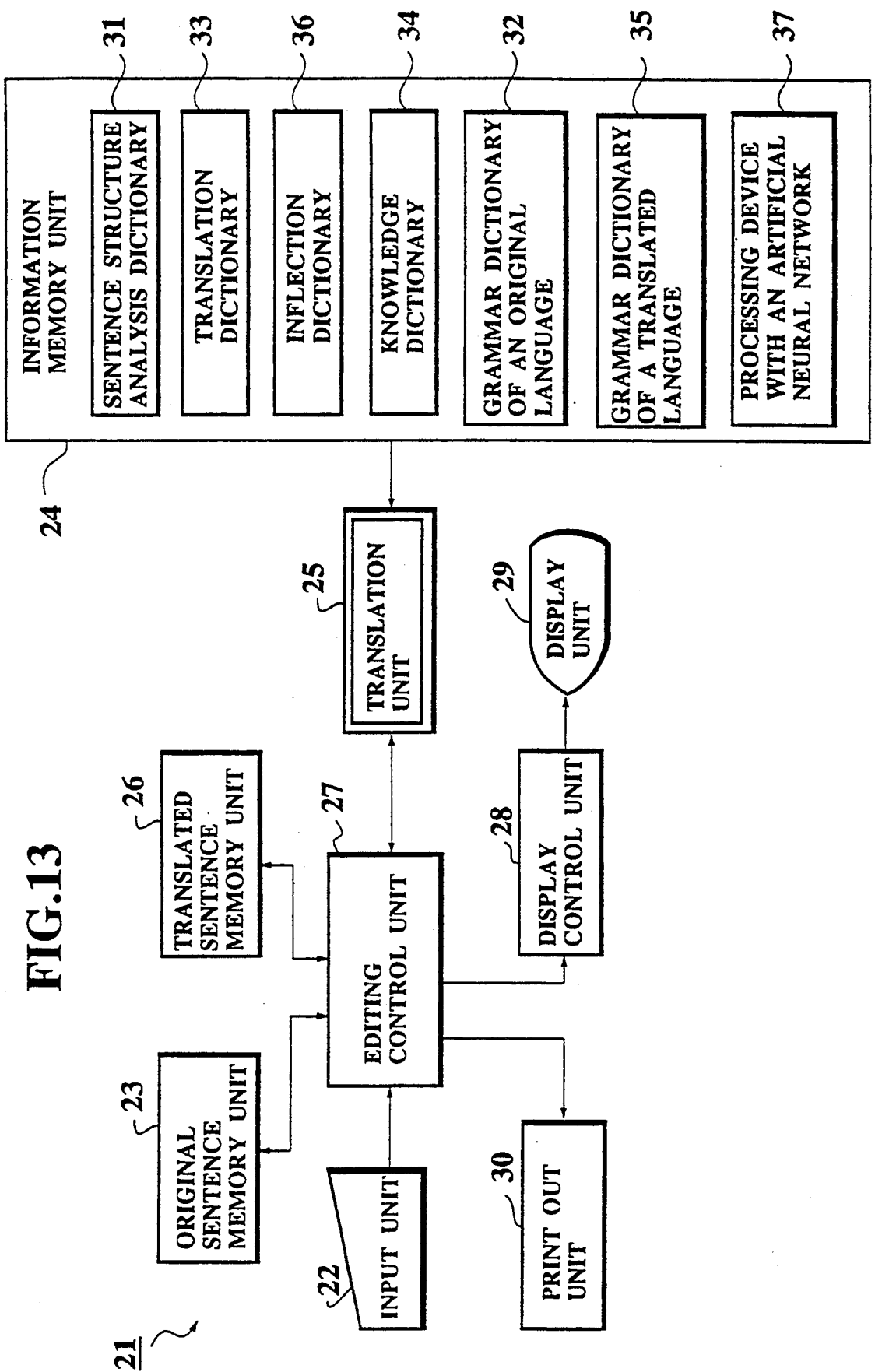
FIG. 13 is a block diagram of machine translation apparatus for translating an original sentence such as an English sentence into a translated sentence such as a Japanese sentence according to a fourth embodiment.

FIG. 13 is a block diagram of a machine translation apparatus for translating an original sentence such as an English sentence into a translated sentence such as a Japanese sentence according to the fourth embodiment.

As shown in FIG. 13, a machine translation apparatus 21 for translating original sentences into translated sentences comprises:

an input unit 22 such as a keyboard for inputting the original sentences such as English sentences composed of a series of original words;

an original sentence memory unit 23 for storing the original sentences input from the input unit 22 by an operator;

an information memory unit 24 for storing information required to translate the original sentences into translated sentences such as Japanese sentences, the information being composed of dictionaries of original/translated words and grammar of original/translated sentences;

a translation unit 25 for translating the original sentences stored in the original sentence memory unit into the translated sentences while referring the information stored in the information memory unit 24;

a translated sentence memory unit 26 for storing the translated sentences obtained in the translation unit 25;

an editing control unit 27 for controlling the input process and the machine translation process, (1) the original sentences input from the input unit 22 being stored in the original sentence memory unit 23 under the control of the editing control unit 27, (2) the original sentences stored in the original sentence memory unit 23 being transmitted to the translation unit 25 under the control of the editing control unit 27, and (3) the translated sentences obtained in the translation unit 25 being stored in the translated sentence memory unit 26 under the control of the editing control unit 27;

a display control unit 28 for setting the original sentences stored in the original sentence memory unit 23 and the translated sentences stored in the translated sentence memory unit 26 on a one-to-one correspondence under the control of the editing control unit 27;

a display unit 29 such as a CRT display for simultaneously displaying the original sentences and the translated sentences set on a one-to-one correspondence by the display control unit 28; and a print out unit 30 for printing out the translated sentences displayed by the display unit 29 under the control of the editing control unit 27.

In addition, the information memory unit 24 comprises:

a sentence structure analysis dictionary 31 for storing parts of speech of the original words in an original word form, each part of speech of the original word being analyzed by referring the sentence structure analysis dictionary 31;

a grammar dictionary 32 of an original language for storing the grammar of the original language, the sentence structure of the original sentences being analyzed by referring both the sentence structure analysis dictionary 31 and the grammar dictionary 32 of the original language;

a translation dictionary 33 for storing words of the translated language linguistically corresponding to the original words of which the sentence structure is analyzed by referring both the sentence structure analysis dictionary 31 and the grammar dictionary 32 of the original language;

a knowledge dictionary 34 for storing the knowledge of technical terms in the original language to support the translation of the original words implemented by referring the translation dictionary 33, a series of translated words being made from the original words by referring both the translation dictionary 38 and the knowledge dictionary 34;

a grammar dictionary 35 of a translated language for storing the grammar of the translated language;

an inflection dictionary 36 for storing the information of the words of the translated language such as the inflection of the declension of nouns and adjectives, the conjugation of verbs, and the tense of verbs, (1) the series of translated words obtained by referring both the translation dictionary 33 and the knowledge dictionary 34 being changed to the translated sentences by referring both the grammar dictionary 35 and the inflection dictionary 36, and (2) inappropriate expression remaining in the translated sentences because the selection of the translated words is not fit for the translated sentences; and a processing device 37 with an artificial neural network for completely correcting the inappropriate expression remaining in the translated sentences according to the first and second embodiments of the present invention.

In the above configuration of the machine translation apparatus 21, the original sentences such as English sentences are input in the input unit 22 by an operator before the original sentences are stored in the original sentence memory unit 23 under the control of the editing control unit 27. Thereafter, the original sentences stored in the original sentence memory unit 23 are transmitted to the translation unit 25 under the control of the editing control unit 27 before the original sentences are automatically translated.

Figure 14:
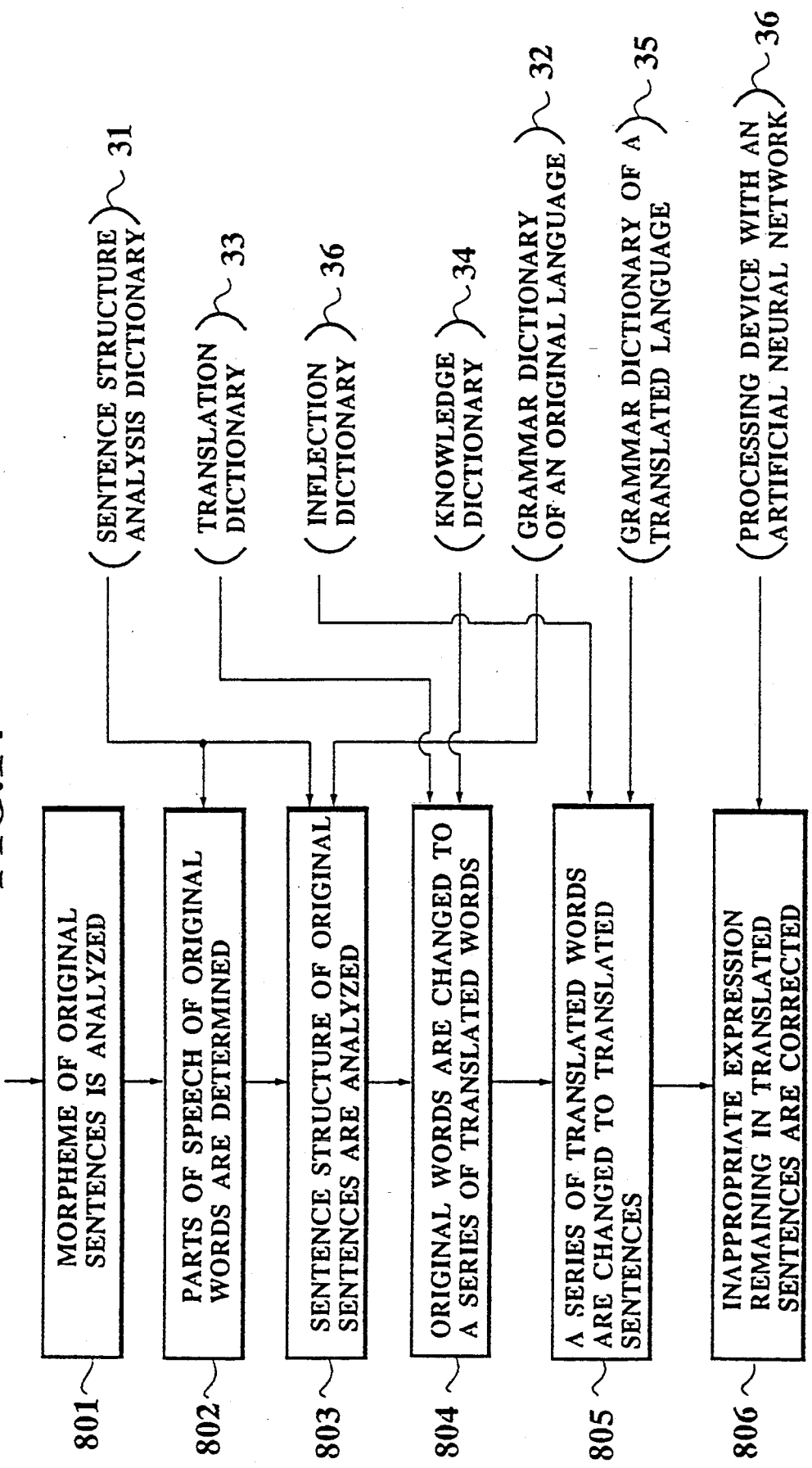
FIG. 14 is a flow chart showing a process implemented in a translation unit of the machine translation apparatus shown in FIG. 13 while referring the information stored in an information memory unit.

In the translation unit 25, as shown in FIG. 14, the morpheme of the original sentences is linguistically analyzed in a step 801. In detail, the inflection such as the declension of nouns and adjectives, the conjugation of verbs, and the tense of verbs is analyzed to change the inflection of the words to an original word form. Specifically, the verbs expressed by the past tense form, the past perfect tense form, the past particle form, the present particle form, or the progressive form are inflected to the present tense form such as the bare infinitive. Also, the adjectives expressed by the comparative degree form or the superlative degree form are inflected to the original form.

Thereafter, parts of speech of the original words of which the morpheme is linguistically analyzed are determined by referring the sentence structure analysis dictionary 31, in a step 802.

Thereafter, the sentence structure of the original sentences of which the parts of speech of the words are determined is analyzed by referring both the sentence structure analysis dictionary 31 and the grammar dictionary 32 of the original language, in a step 803. The analysis of the sentence structure is repeated until no contradiction is found out in the analysis of the sentence structure. As a result, the arrangement of the parts of speech of the original words, the grammatical relation between the original words, and the variation of the tense are determined by the analysis of the sentence structure.

Thereafter, in a step 804, the original words are changed to a series of translated words by referring both the translation dictionary 33 and the knowledge dictionary 34. Also, the relation between the sentence structure of the original language and the sentence structure of the translated language is determined.

Thereafter, the series of translated words are changed to the translated sentences by referring both the grammar dictionary 35 and the inflection dictionary 36 and by considering the relation between the sentence structure of the original language and the sentence structure of the translated language, in a step 805. In detail, the translated sentences are made while considering the inflection such as the declension of nouns and adjectives, the conjugation of verbs, and the tense of verbs to obtain the appropriately expressed sentences.

However, large pieces of inappropriate expression remain in the translated sentences for practical use because the selection of the translated words is not fit for the translated sentences. That is, the selection of the translated words in the step 804 is implemented without considering the polysemy of the original word which semantically corresponds to a plurality of words of the translated language. The difficulty of the translation resulting from the polysemy of the original word can be resolved by considering the semantical relation between the words of the translated language. In detail, the words semantically relevant to one another are often utilized in a sentence simultaneously because the sentence is made to express a specific topic. On the other hand, the words semantically irrelevant to one another are hardly utilized in a sentence simultaneously.

Therefore, in a step 806, large pieces of inappropriate expression remaining in the translated sentences are completely corrected by considering the semantical relation between the words of the translated language with utilizing the processing device 37 with an artificial neural network,.

In detail, the words of the translated language are assigned to the artificial neurons in the artificial neural network. The artificial neurons assigned the words semantically relevant to one another are interconnected through links weighted by positive values. The value weighting the link becomes high as the words interconnected through the link are closely relevant to each other. On the other hand, the artificial neurons assigned the words semantically irrelevant to one another are interconnected through links weighted by negative values. The negative value weighting the link becomes low as the words interconnected through the link are further irrelevant to each other.

Thereafter, one or more original words classified as the monosemy which each semantically corresponds to a word Wm of the translated language are first selected before external inputs with a positive high value is provided to artificial neurons Nm assigned the words Wm. Thereafter, the output values of all of the artificial neurons are converged in the artificial neural network according to the equations (10) to (13). Therefore, the output values of artificial neurons Nms assigned words semantically relevant to the words Wm are increased because the artificial neurons Nms are interconnected with the artificial neurons Nm through the links weighted with the positive values, while the output values of artificial neurons Nmi assigned words semantically irrelevant to the words Wm are decreased because the artificial neurons Nmi is interconnected with the artificial neurons Nm through the links weighted with the negative values.

However, an output value of an artificial neuron assigned a word W1 of the translated language semantically corresponding to an original word classified as the polysemy is not sufficiently high to select the word W1 as a translated word from the words assigned to the artificial neurons Nms.

Therefore, after the convergence of the output values of the artificial neurons, artificial neurons Nps assigned words of the translated language semantically corresponding to original words classified as the polysemy are selected, and artificial neurons Npi assigned words of the translated language not semantically corresponding to the original words are selected. Thereafter, according to the first and second embodiments, the external inputs with the positive values are provided to the artificial neurons Nps and the external inputs with the negative values are provided to the artificial neurons Npi. Therefore, the output values of the artificial neurons Nps are kept high for a period of time.

Thereafter, the artificial neurons Nps are selected to adopt the words assigned to the artificial neurons Nps as translated words. Each of the artificial neurons Nps provides the highest output values among the artificial is neurons assigned words of the translated language linguistically corresponding to an original word classified as the polysemy.

Accordingly, as shown in FIG. 10, the output values of the artificial neurons Nps assigned the words selected as the translated words are considerably increased because the external inputs with the positive values are provided to the artificial neurons Nps and the range of the output values are specified between the high limit $h(I_j)$ and the low limit $l(I_j)$ according to the second embodiment, while the output values of the artificial neurons Npi assigned the words not selected as the translated words are considerably decreased because the external inputs with the negative values are provided to the artificial neurons and the functions $h(I_j)$ and $l(I_j)$ are the monotonic increasing functions with respect to the external input $I_j$.

In addition, as shown in Table 2, the output values of the artificial neurons Nps assigned the words selected as the translated words are maintained at high values for a period of time because the external inputs with reduced positive values are provided to the artificial neurons for a period of time according to the first embodiment, while the output values of the artificial neurons Npi assigned the words not selected as the translated words are maintained at low values for a period of time because the external inputs with reduced negative values are provided to the artificial neurons for a period of time.

Accordingly, the words of the translated language appropriately fit for the original sentences can be easily selected as the translated words because the output values of the artificial neurons assigned the words appropriately fit as the translated words are maintained at high values.

Thereafter, the translated sentences completely corrected to the appropriate expression by the processing device 37 with an artificial neural network are stored in the translated sentence memory unit 26 before the translated sentences are displayed on the display unit 29 or are printed out from the print out unit 30.

Next, an example in which words of the translated language are selected as translated words by applying a natural language translation method according to a fourth embodiment of the present invention are described.

In this example, an English sentence "The boys hasten to the playground with bats, balls, and gloves." is translated into Japanese.

There are many polysemies (or polysemous words) in the English sentence as follows.

| polysemy | first meaning | second meaning |
|---|---|---|
| "bat" | "bat" of a baseball | "bat" of an animal |
| "ball" | "ball" of a baseball | "ball" of a dance |

| polysemy | first meaning | second meaning |
| --- | --- | --- |
| "glove" | "glove" of a baseball | "glove" of a ski |

In this case, even though the grammar and parts of speech off the English sentence are analyzed, the English sentence cannot be appropriately translated into Japanese.

Figure 15:
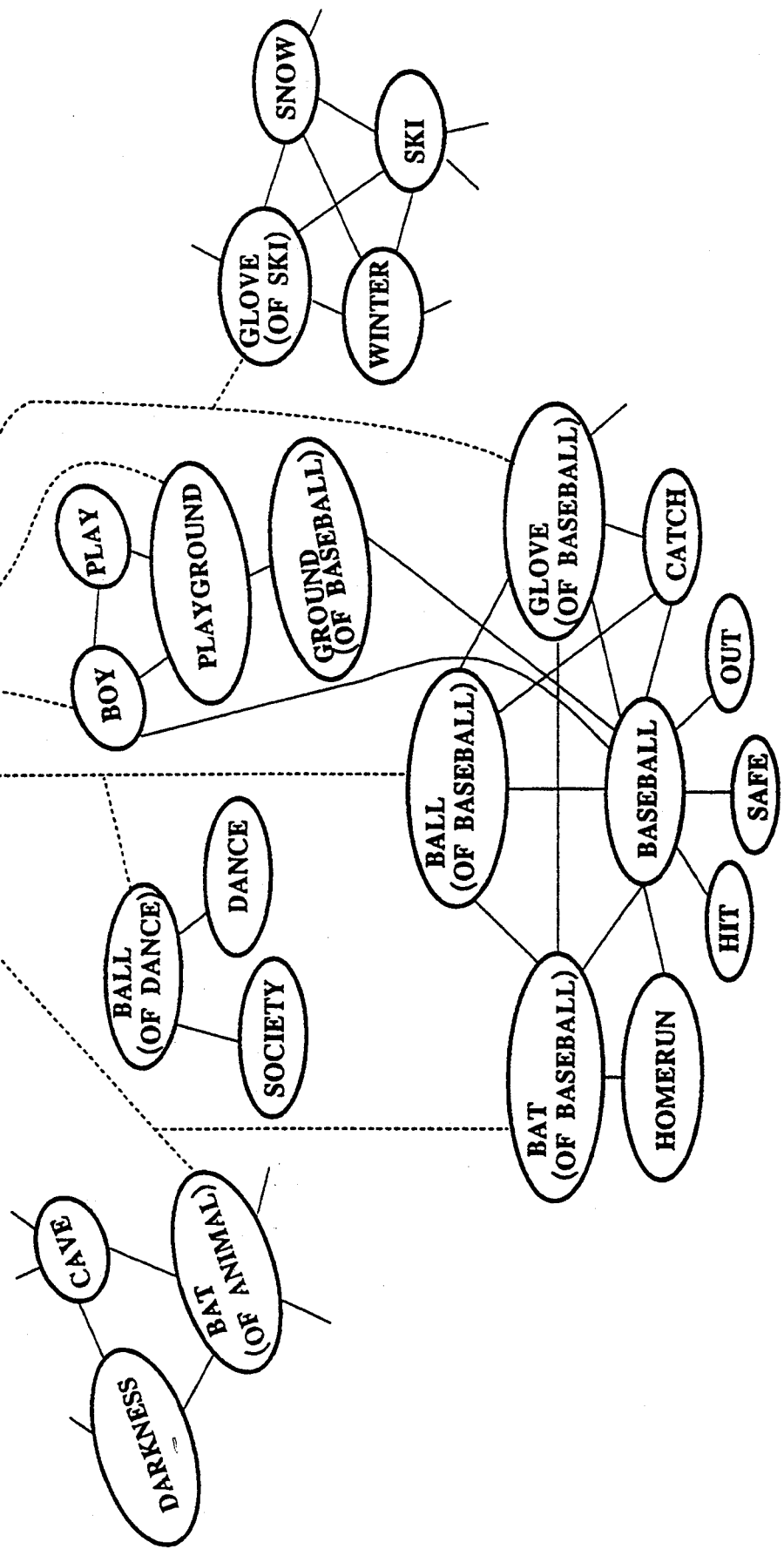
FIG. 15 shows an artificial neural network in which the words of the Japanese language (drawn in English) assigned to artificial neurons are interconnected through links.

Therefore, the selection of the words of the Japanese language is implemented by utilizing a recognition-comprehension technique according to a connection model with reference to FIG. 15.

FIG. 15 shows an artificial neural network in which the words of the Japanese language (drawn in English) assigned to artificial neurons are interconnected through links.

As shown in FIG. 15, artificial neurons assigned respective words semantically relevant to one another are interconnected through links weighted by positive values in the artificial neural network. On the other hand, artificial neurons assigned respective words semantically irrelevant to one another being interconnected through a ink weighted by negative values (the link is omitted in FIG. 15).

In the above configuration of the artificial neural network, an external input with a positive high value is first provided to the artificial neurons assigned the words "boy" and "playground" because each of the words "boy" and "playground" is the monosemy (or a monosemous word). Thereafter, the output values of all the artificial neurons assigned the words are converged according to the equations (10) to (13) of the second embodiment.

After the convergence, the outputs of the artificial neurons assigned the words "bat of baseball", "ball of baseball" and "glove of baseball" become at positive values according to the second embodiment, while the output values of the artificial neurons assigned the words "bat of animal", "ball of dance" and "glove of ski" become low according to the second embodiment. In this case, the values of the artificial neurons assigned the words such as "bat of baseball" are not sufficiently high to adopt the words as translated words. Thereafter, external inputs with positive values are provided, one after another, to the artificial neurons assigned the words "bat of baseball", "ball of baseball" and "glove of baseball" to considerably increase the output values of the artificial neurons according to the second embodiment. Also, external inputs with negative values are provided, one after another, to the artificial neurons assigned the words "bat of animal", "ball of dance" and "glove of ski" to considerably decrease the output values of the artificial neurons according to the second embodiment.

In this case, according to the first embodiment, the external inputs provided to the artificial neurons assigned the Japanese words linguistically corresponding to the English words "bat", "ball" and "glove" are stored in the artificial neurons and are gradually reduced to again provide to the artificial neurons each time the convergence is implemented in the artificial neural network.

Therefore, the values of the artificial neurons assigned the words "bat of baseball", "ball of baseball" and "glove of baseball" sufficiently become high to adopt the words as the translated words. In addition, the values of the artificial neurons are kept high for a period of time.

Accordingly, in cases where the artificial neuron providing the highest output value among the output values provided by the artificial neurons assigned the Japanese words linguistically corresponding to the English word "bat", "ball" or "glove" is selected, the English sentence can be appropriately translated into Japanese.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An apparatus For translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words of the second language;

processing means for (1) operating an artificial neural network in which
   a plurality of artificial neurons are assigned the words of the second language stored in the second language word memory means,
   positive links through which the artificial neurons assigned the words semantically relevant to one another are interconnected are weighted with positive values to increase the output values of the artificial neurons in cases where an external input is provided to one of the artificial neurons, and
   negative links through which the artificial neurons assigned the words semantically irrelevant to one another are interconnected are weighted with negative values to decrease the output values of the artificial neurons in cases where an external input is provided to one of the artificial neurons.

(2) providing external inputs Im to artificial neurons Nm which are assigned words Wm of the second language linguistically and semantically corresponding to the original words classified as the monosemy to increase the output values of artificial neurons Nms assigned the words semantically relevant to the words Wm and to decrease the output values of artificial neurons Nmi assigned the words semantically irrelevant to the words Wm, (3) providing an external input Ip, one after another, to each of the artificial neurons Nms to considerably increase the output values of artificial neurons Nmp which belongs to the artificial neurons Nms and artificial neurons Np assigned the words of the second language linguistically corresponding to the original words classified as the polysemy, the external input Ip provided to each of the artificial neurons Nms being stored therein, and the value of the external input Ip previously stored in the artificial neurons Nms being uniformly reduced to again provide to each of the artificial neurons Nms as past records each time the external input Ip is provided to each of the artificial neurons Nms.

(4) repeatedly converging the output values of all of the artificial neurons each time the external input Ip is provided to each of the artificial neurons Nms, (5) adopting words Wmp assigned to the artificial neurons Nmp, as translated words, of which the output values are considerably increased, and (6) adopting the words Wm as the translated words, the translated sentence being composed of the word Wmp and the words Wm; and translation means for translating the original sentence into the translated sentence according to a translation process in which (1) the sentence structure of the original sentence is analyzed by referring the parts of speech of the original words stored in the sentence structure memory means and the grammar of the first language stored in the first language grammar memory means, (2) the original words are changed to a series of words which are composed of the words linguistically corresponding to the original words classified as the monosemy and the words Wmp, Wm adopted in the processing means, and (3) a series of words of the second language are changed to the translated sentence by referring the grammar of the second language stored in the second language grammar memory means and the inflection information of the words of the second language stored in the inflection memory means.

2. An apparatus of for translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words off the second language;

processing means for (a) operating an artificial neural network in which
a plurality of artificial neurons are assigned the words of the second language stored in the second language word memory means, positive links through which the artificial neurons assigned the words semantically relevant to one another are interconnected are weighted with positive values to increase the output values of the artificial neurons in cases where an external input is provided to one of the artificial neurons, and negative links through which the artificial neurons assigned the words semantically irrelevant to one another are interconnected are weighted with negative values to decrease the output values of the artificial neurons in cases where an external input is provided to one of the artificial neurons, (b) determining an output value $O_j$ of an artificial neuron j regardless of whether or not the artificial neuron j receives an external input value $I_j$, the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and a value of a variable $net_j$ depending on a value of an external input $I_j$ provided to the artificial neuron j, output values $O_i$ of the other artificial neurons i interconnected with the artificial neuron j through the links weighted with weight parameters $W_{ji}$, and the weight parameters $W_{ji}$, as is formulated by an equation (3)

$$net_j = \sum_i W_{ji} O_i + I_j \quad (3)$$

wherein the value of the external input $I_j$ equals zero when the artificial neuron j receives no external input, (c) providing external inputs Im to artificial neurons Nm which are assigned words Wm of the second language linguistically and semantically corresponding to the original words classified as the monosemy to increase the outputs of artificial neurons Nms assigned the words semantically relevant to the words Wm and to decrease the output values of artificial neurons Nmi assigned the words semantically irrelevant to the words Wm, (d) detecting artificial neurons Nh of which the output values are increased by the provision of the external input Im from artificial neurons Np assigned the words of the second language linguistically corresponding to the original words classified as the polysemy, (e) detecting artificial neurons Nl of which the output values are decreased by the provision of the external input Im from the artificial neurons Np, (f) providing an external input Iph with a high value to the artificial neurons Nh to considerably increase the output values of the artificial neurons Nh to above a value h(O) according to the equations (1) and (3), (g) providing an external input Ipl with a low value to the artificial neurons NL to considerably decrease the output values of the artificial neurons NL to below a value l(O) according to the equations (1) and (3), (h) adopting words Wp assigned to the artificial neurons Nh, as translated words of which the outputs are higher than the value h(O), and (i) adopting the word Wm as the translated words, the translated sentence being composed of the words Wp and the words Wm; and translation means for translating the original sentence into the translated sentence according to a translation process in which the sentence structure of the original sentence is analyzed by referring the parts of speech of the original words stored in the sentence structure memory means and the grammar of the first language stored in the first language grammar memory means.

the original words are changed to a series of words which are composed of the words linguistically corresponding to the original words classified as the monosemy and the words WD, Wm adopted in the processing means, and a series of words of the second language are changed to the translated sentence by referring the grammar of the second language stored in the second language grammar memory means and the inflection information of the words of the second language stored in the inflection memory means.

3. An apparatus for translating original words in an original sentence written by a first language into words in a translated sentence of a second language, comprising:

sentence structure memory means for storing parts of speech of the original words which are required to analyze the sentence structure of the original sentence;

first language grammar memory means for storing the grammar of a first language of the original sentence;

second language word memory means for storing the words of the second language, wherein each of the original words classified as monosemy linguistically and semantically corresponds to a word of the second language stored in the second language word memory means and each of the original words classified as polysemy linguistically corresponds to a plurality of words of the second language stored in the second language word memory means;

second language grammar memory means for storing the grammar of the second language;

inflection memory means for storing inflection information of the words of the second language;

processing means for (a) operating an artificial neural network in which a plurality of artificial neurons are assigned the words of the second language stored in the second language word memory means, positive links through which the artificial neurons assigned the words semantically relevant to one another are interconnected are weighted with positive values to increase the output values of the artificial neurons in cases where an external input is provided to one of the artificial neurons, and negative links through which the artificial neurons assigned the words semantically irrelevant to one another are interconnected are weighted with negative values to decrease the output values of the artificial neurons in cases where an external input is provided to one of the artificial neurons, (b) determining an output value $O_j$ of an artificial neuron j regardless of whether or not the artificial neuron j receives an external input value $I_j$, the output value $O_j$ being varied according to a monotonic increasing function $F(net_j)$ with upper and lower limits $h(I_j)$, $l(I_j)$ as is formulated by equations (1) and (2)

$$O_j = F(net_j), \qquad (1)$$

$$L \leq l(I_j) < h(I_j) \leq H \qquad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and a value of a variable $net_j$ depending on a value of an external input $I_j$ provided to the artificial neuron j, output values $O_i$ of the other artificial neurons i interconnected with the artificial neuron j through the links weighted by weight parameters $W_{ji}$, and the weight parameters $W_{ji}$, as is formulated by an equation (3)

$$net_j = \sum_i W_{ji} O_i + I_j \qquad (3)$$

wherein the value of the external input $I_j$ equals zero when the artificial neuron j receives no external input, (c) providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm, (d) detecting artificial neurons Nh of which the output values are increased by the provision of the external input Im from artificial neurons Np assigned the words of the second language linguistically corresponding to the original words classified as the polysemy, (e) providing an external input Ip with a high value, one after another to each of the artificial neurons Nms to considerably increase the output values of the artificial neurons Nms to above a value h(O) according to the equations (1) and (3), the external input Ip provided to each of the artificial neurons Nms being stored therein, and the value of the external input Ip previously stored in the artificial neurons Nms being uniformly reduced to again provide to each of the artificial neurons Nms as past records each time the external input Ip is provided to each of the artificial neurons Nms, (f) repeatedly converging the output values of all of the artificial neurons each time the external input Ip is provided to each of the artificial neurons Nms, (g) adopting words Wp assigned to the artificial neurons Nh of which the outputs are higher than the value h(O), as translated words, and (h) adopting the word Wm as the translated words, the translated sentence being composed of the words Wp and the words Wm; and translation means for translating the original sentence into the translated sentence according to a translation process in which the sentence structure of the original sentence is analyzed by referring the parts of speech of the original words stored in the sentence structure memory means and the grammar of the first language stored in the first language grammar memory means, the original words are changed to a series of words which are composed of the words linguistically corresponding to the original words classified as the monosemy and the words Wp, Wm adopted in the processing means, and a series of words of the second language are changed to the translated sentence by referring the grammar of the second language stored in the second language grammar memory means and the inflection information of the words of the second language stored in the inflection memory means.

4. A method for translating original words in an original sentence written by a first language into words in a translated sentence of a second language in an artificial neural network in which a plurality of artificial neurons are interconnected through links, an output value of an artificial neuron NL depends on a value of an external input provided to the artificial neuron NL and output values of the other artificial neurons interconnected with the artificial neuron NL through the links, and the output values of all the artificial neurons are determined after the convergence of the output values, comprising the steps of:

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons;

weighting the links through which the artificial neurons assigned the words semantically relevant to one another are interconnected, with positive values, the output values of the artificial neurons interconnected through the links with the positive values being increased in cases where an external input is provided to one of the artificial neurons;

weighting the links through which the artificial neurons which are assigned the words semantically irrelevant to one another are interconnected, with negative values, the output values of the artificial neurons interconnected through the links with the negative values being decreased in eases where an external input is provided to one of the artificial neurons;

providing external inputs Im to artificial neurons Nm which are assigned words Wm of the second language linguistically and semantically corresponding to the original words classified as the monosemy to increase the output values of artificial neurons Nms assigned the words semantically relevant to the words Wm and to decrease the output values of artificial neurons Nmi assigned the words semantically irrelevant to the words Wm;

providing an external input Ip, one after another, to each of the artificial neurons Nms to considerably increase the output values of artificial neurons Nmp which belongs to the artificial neurons Nms and artificial neurons Np assigned the words of the second language linguistically corresponding to the original words classified as the polysemy, the external input Ip provided to each of the artificial neurons Nms being stored therein, and the value of the external input Ip previously stored in the artificial neurons Nms being uniformly reduced to again provide to each of the artificial neurons Nms as past records each time the external input Ip is provided to each of the artificial neurons Nms;

repeatedly converging the output values of all of the artificial neurons each time the external input Ip is provided to each of the artificial neurons Nms;

adopting words Wmp assigned to the artificial neurons Nmp, as translated words, of which the output values are considerably increased; and adopting the words Wm as the translated words, the translated sentence of the second language being composed of the words Wmp and the words Wm.

5. A method for translating original words in an original sentence written by a first language into words of a translated sentence of a second language in an artificial neural network in which a plurality of artificial neurons are interconnected through links with weights and each artificial neuron provides an output value, comprising the steps of:

determining an output value $O_j$ of an artificial neuron j regardless of whether or not the artificial neuron j receives an external input value $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \qquad (1)$$

$$L \leq l(I_j) < h(I_j) \leq H \qquad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and (b) a value of a variable $net_j$ depending on a value of an external input $I_j$ provided to the artificial neuron j, output values $O_i$ of the other artificial neurons i interconnected with the artificial neuron j through the links weighted with weight parameters $W_{ji}$, and the weight parameters $W_{ji}$, as is formulated by an equation (3)

$$net_j = \sum_i W_{ji} O_i + I_j \qquad (3)$$

wherein the value of the external input $I_j$ equals zero when the artificial neuron j receives no external input;

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons;

weighting the links through which the artificial neurons assigned the words semantically relevant to one another are interconnected, with positive values to increase the output values of the artificial neurons in cases where an external input is provided to one of the artificial neurons;

weighting the links through which the artificial neurons assigned the words semantically irrelevant to one another are interconnected, with negative values to decrease the output values of the artificial neurons in cases where an external input is provided to one of the artificial neurons;

providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm;

detecting artificial neurons Nh of which the output values are increased by the provision of the external input Im from artificial neurons Np assigned the words of the second language linguistically corresponding to the original words classified as the polysemy;

detecting artificial neurons NL of which the output values are decreased by the provision of the external input Im From the artificial neurons Np;

providing an external input Iph with a high value to the artificial neurons Nh to considerably increase the output values of the artificial neurons Nh to above a value h(O) according to the equations (1) and (3);

providing an external input Ipl with a low value to the artificial neurons NL to considerably decrease the output values of the artificial neurons NL to below a value L(O) according to the equations (1) and (3);

adopting words Wp assigned to the artificial neurons Nh, as translated words, of which the output values are higher than the value h(O); and adopting the word Wm as the translated words, the translated sentence being composed of the words Wp and the words Wm.

6. A method for translating original words in an original sentence written by a first language into words of a translated sentence of a second language in an artificial neural network in which a plurality of artificial neurons are interconnected through links with weights and each artificial neuron provides an output value, comprising the steps of:

determining an output value $O_j$ of an artificial neuron j regardless of whether or not the artificial neuron j receives an external input value $I_j$, (a) the output value $O_j$ being varied according to a monotonic increasing function $F(net_j)$ with upper and lower limits $h(I_j)$, $l(I_j)$ as is formulated by equations (1) and (2)

$$O_j = F(net_j), \quad (1)$$

$$L \leq l(I_j) < h(I_j) \leq H \quad (2)$$

wherein the upper limit $h(I_j)$ and the lower limit $l(I_j)$ are monotonic increasing functions, a minimum value of the lower limit $l(I_j)$ equals a low constant L, and a maximum value of the upper limit $h(I_j)$ is a high constant H, and (b) a value of a variable $net_j$ depending on a value of an external input $I_j$ provided to the artificial neuron j, output values $O_i$ of the other artificial neurons i interconnected with the artificial neuron j through the links weighted by weight parameters $W_{ji}$, and the weight parameters $W_{ji}$, as is formulated by an equation (3)

$$net_j = \sum_i W_{ji} O_i + I_j \quad (3)$$

where the value of the external input $I_j$ equals zero when the artificial neuron j receives no external input;

classifying the original words in the original sentence of the first language as monosemy or polysemy, each of the original words classified as the monosemy linguistically and semantically corresponding to one of the words of the second language, and each of the original words classified as the polysemy linguistically corresponding to a plurality of words of the second language;

assigning the words of the second language to the artificial neurons, weighting the links through which the artificial neurons assigned the words semantically relevant to one another are interconnected, with positive values, the output values of the artificial neurons being increased in cases where an external input is provided to one of the artificial neurons;

weighting the links through which the artificial neurons assigned the words semantically irrelevant to one another are interconnected, with negative values, the output values of the artificial neurons being decreased in cases where an external input is provided to one of the artificial neurons;

providing external inputs Im to artificial neurons Nm assigned words Wm of the second language linguistically and semantically corresponding to the original words classified as the monosemy to increase the output values of artificial neurons Nms assigned the words semantically relevant to the words Wm and to decrease the output values of artificial neuron Nmi assigned the words semantically irrelevant to the words Wm;

detecting, artificial neurons Nh of which the output values are increased by the provision of the external input Im from artificial neurons Np assigned the words of the second language linguistically corresponding to the original words classified as the polysemy;

providing an external input Ip with a high value, one after another to each of the artificial neurons Nms to considerably increase the output values of the artificial neurons Nms to above a value h(O) according to the equations (1) and (3), the external input Ip provided to each of the artificial neurons Nms being stored therein, and the value of the external input Ip previously stored in the artificial neurons Nms being uniformly reduced to again provide to each of the artificial neurons Nms as past records each time the external input Ip is provided to each of the artificial neurons Nms;

repeatedly converging the output values of all of the artificial neurons each time the external input Ip is provided to each of the artificial neurons Nms;

adopting words Wp assigned to the artificial neurons Nh of which the outputs are higher than the value h(O), as translated words; and adopting the word Wm as the translated words, the translated sentence being composed of the words Wp and the words Wm.

* * * * *